United States Patent [19]
Dodge

[11] Patent Number: 5,509,942
[45] Date of Patent: Apr. 23, 1996

[54] MANUFACTURE OF TUBULAR FUEL CELLS WITH STRUCTURAL CURRENT COLLECTORS

[76] Inventor: Cleveland E. Dodge, R.D. 1, Box 7, Pownal, Vt. 05261

[21] Appl. No.: 286,131

[22] Filed: Aug. 4, 1994

Related U.S. Application Data

[63] Continuation-in-part of Ser. No. 15,411, Feb. 9, 1993, Pat. No. 5,336,570, which is a continuation-in-part of Ser. No. 929,706, Aug. 12, 1992, abandoned.

[51] Int. Cl.$^6$ .................................................. H01M 6/00
[52] U.S. Cl. ........................................ 29/623.2; 427/115
[58] Field of Search ............................ 29/623.1, 623.2; 427/115

[56] References Cited

U.S. PATENT DOCUMENTS

| | | | |
|---|---|---|---|
| 4,175,165 | 11/1979 | Adlhart . | |
| 4,756,718 | 7/1988 | Ueno et al. | 29/623.5 |
| 4,824,742 | 4/1989 | Parry . | |
| 4,975,342 | 12/1990 | Matsumoto | 29/623.1 X |
| 5,094,928 | 3/1992 | Dyer . | |
| 5,171,646 | 12/1992 | Rohr . | |

OTHER PUBLICATIONS

Wilson et al.—High Performance Catalyzed Membranes of Ulta–Low Pt Loadings for Polymer Electrolyte Fuel Cells—J. Electrochem. Soc. vol. 139. No. 2, Feb. 1992. pp. L28–L30.

Primary Examiner—Anthony Skapars
Attorney, Agent, or Firm—Handal & Morofsky

[57] ABSTRACT

The manufacture of a hydrogen fuel cell assembly including a hollow member having a construction effective for passing a hydrogen containing gas from its interior to its peripheral surface. An anode is disposed around the peripheral surface of the hollow member and a catalyst at or near the anode decomposes hydrogen molecules in the hydrogen containing gas into H+ ions. The H+ ions pass through an electrolyte member disposed around the anode. A cathode is disposed around the electrolyte member and a catalyst at or near the cathode decomposes oxygen molecules in an oxygen containing gas into oxygen atoms. H+ ions that pass through the electrolyte member react with the oxygen atoms to form water and to generate an electrical current in the anode and cathode system.

A filament may be wound around the cathode to restrain the electrolyte member between and in contact with the anode and the cathode so that transverse swelling of the electrolyte member is displaced in directions generally parallel to the anode and cathode.

At least one of the anode and the cathode can be a conductive winding. A conductive winding cathode may be used in place of the filament to restrain the electrolyte member.

18 Claims, 26 Drawing Sheets

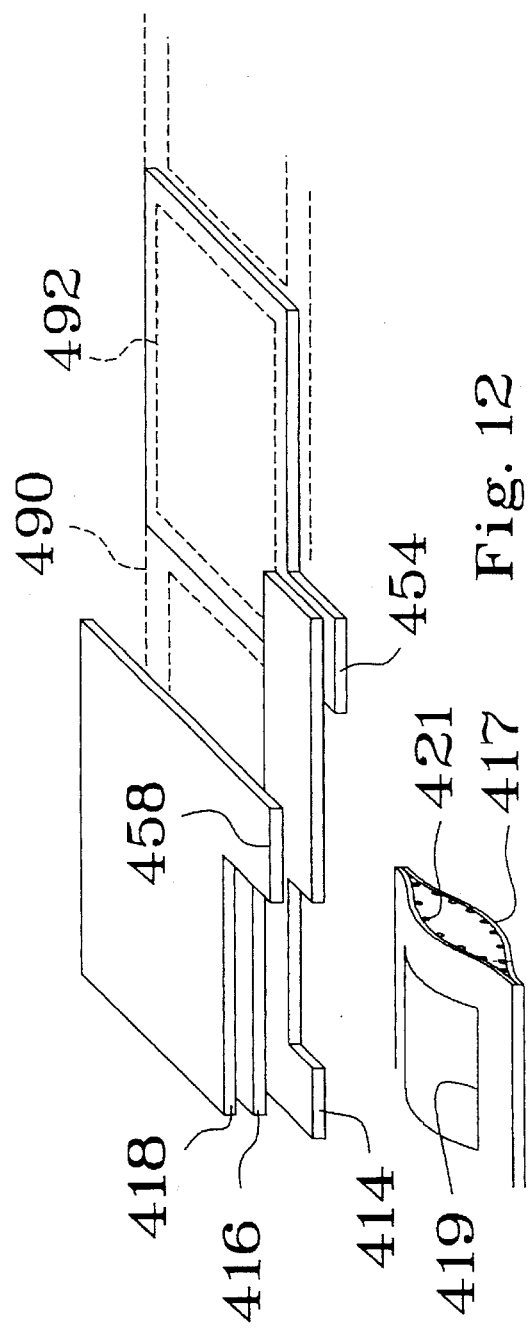
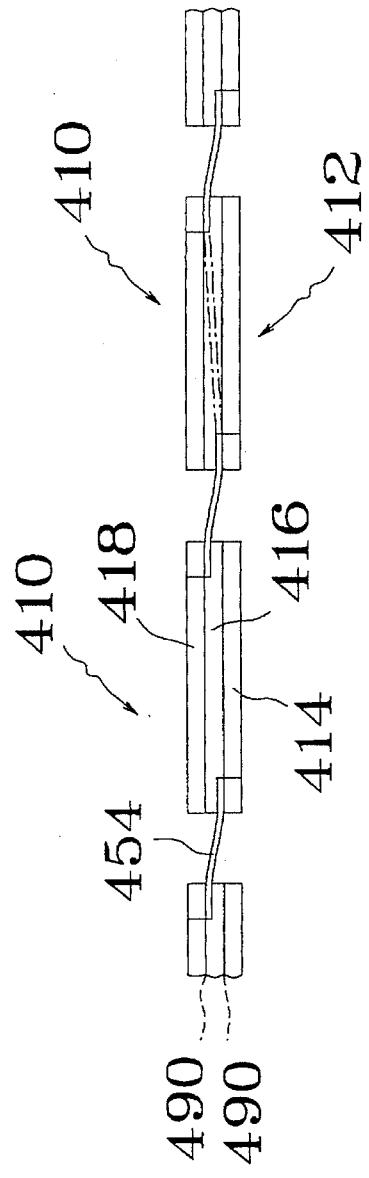
Fig. 12
Fig. 11

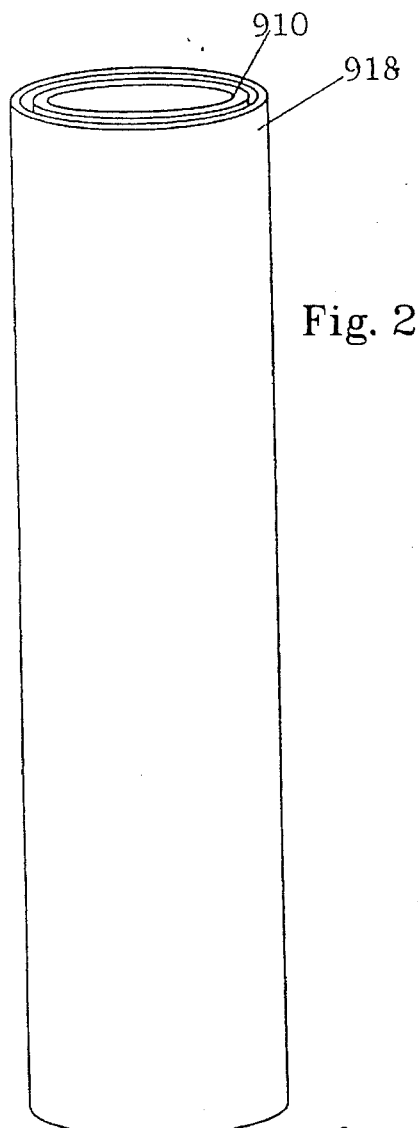
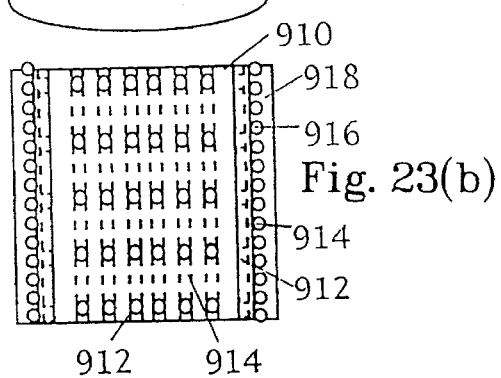
Fig. 23(a)
Fig. 23(b)
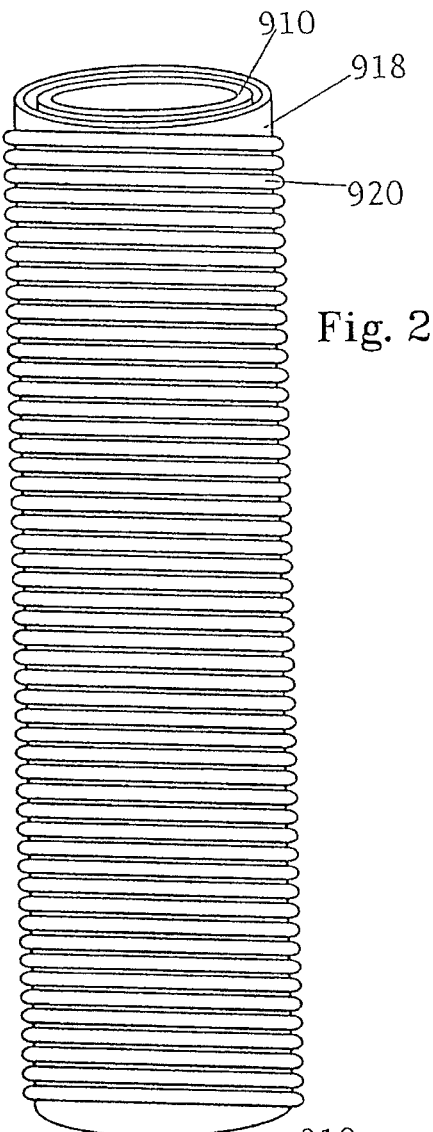
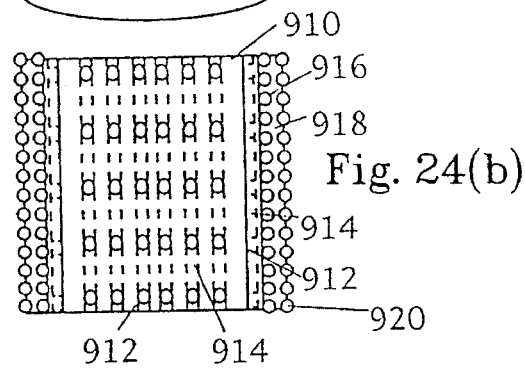
Fig. 24(a)
Fig. 24(b)

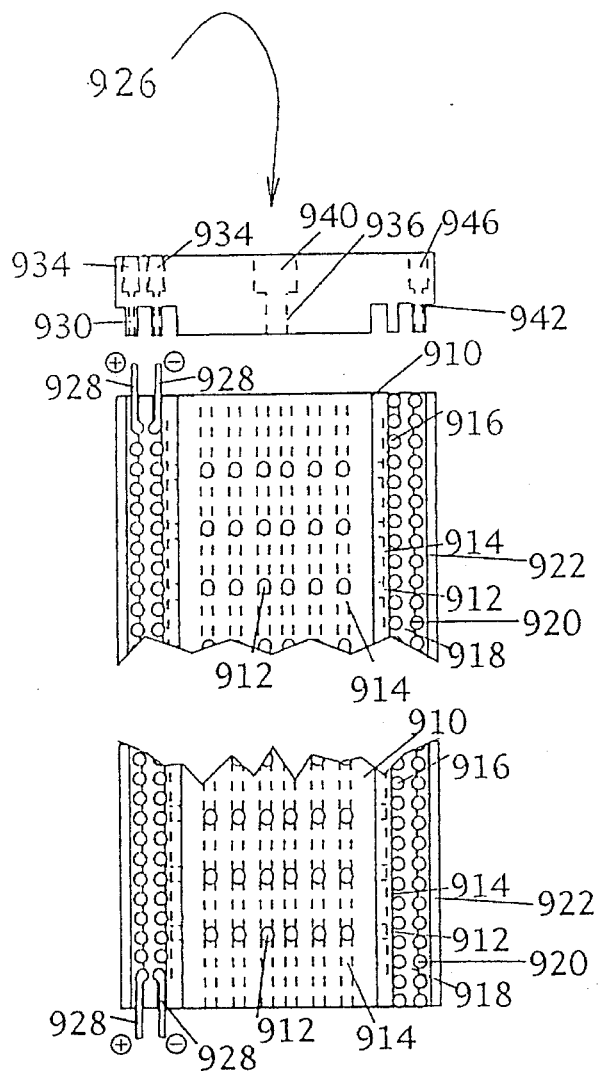
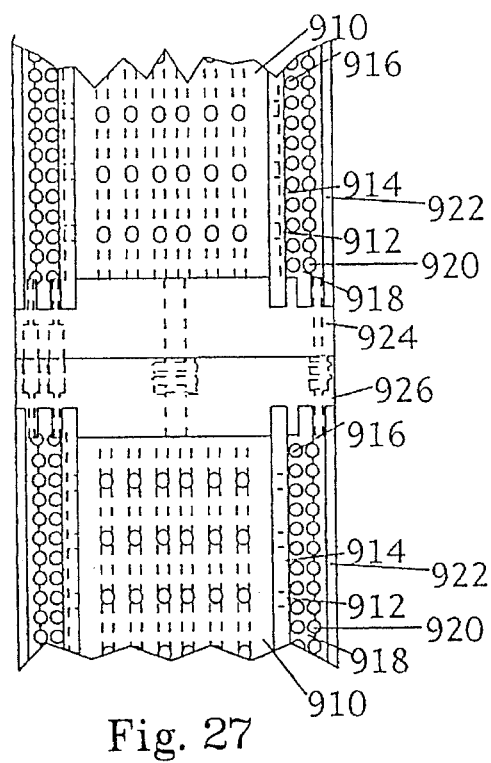
Fig. 26(a)  Fig. 27
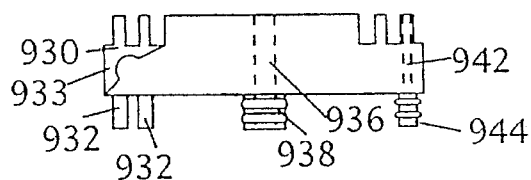
Fig. 26(b)

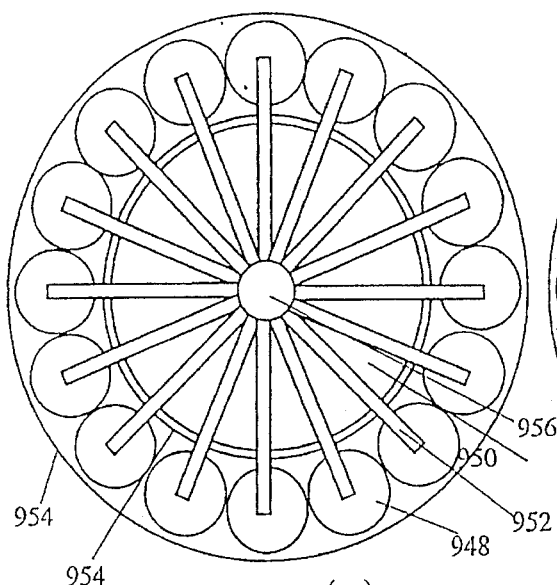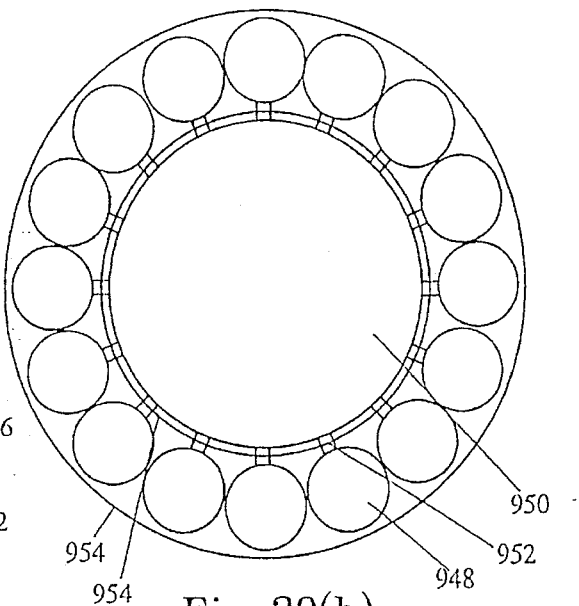
Fig. 30(a)   Fig. 30(b)
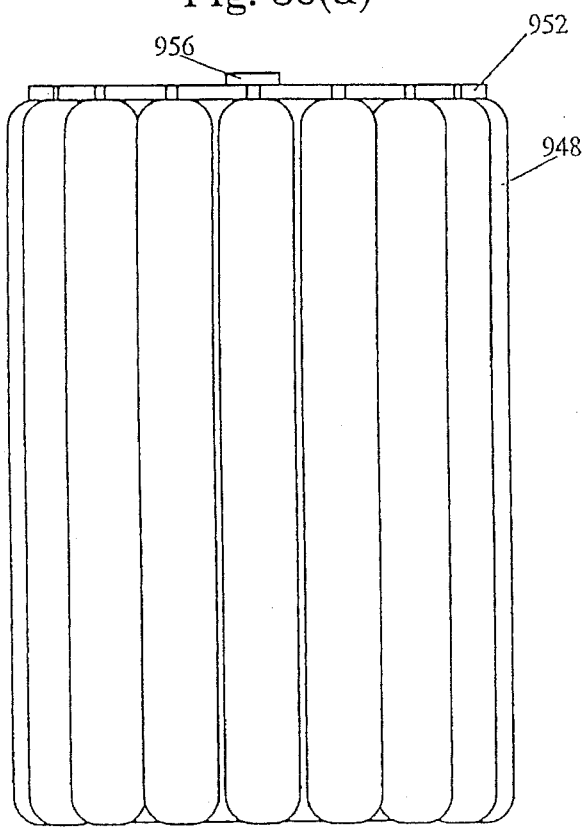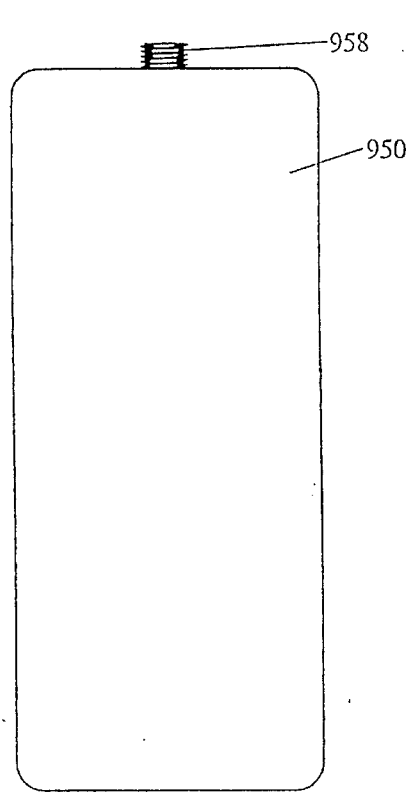
Fig. 31(a)   Fig. 31(b)

MANUFACTURE OF TUBULAR FUEL CELLS WITH STRUCTURAL CURRENT COLLECTORS

This application is a continuation-in-part of application Ser. No. 08/015,411 filed Feb. 9, 1993, now U.S. Pat. No. 5,336,570 which is a continuation-in-part of Ser. No. 07/929,706 filed Aug. 12, 1992, now abandoned.

TECHNICAL FIELD

The present invention relates to a compact configuration for hydrogen power cells: of the type which receive hydrogen fuel and produce electricity.

BACKGROUND

Ever since the political vulnerability of this nation's largely foreign controlled petroleum sources became painfully obvious in the early 1970's, there has been an intensive effort devoted to the development of alternative energy sources and conservation of existing resources. In more recent years, the acute nature of the energy problem has been underscored by a growing public awareness of the related environmental questions.

To a large extent, efforts aimed at energy conservation and alternative energy generation have met with a large degree of success in such areas as the heating and cooling of structures, automobile efficiency and the like. More particularly, large advances have been made by designing hotter running gasoline engines, use of reflective glazing, impermeable construction barriers, solar heating and the like.

However, one technology which has largely failed to live up to its very promising expectations is the use of hydrogen for the generation of electricity. Generally, this technology involves the utilization of hydrogen in electrochemical reaction for the purpose of generating electricity. A device in which such a process is carried out is generally referred to as a fuel cell. Because the electricity is generated by the reaction of hydrogen with oxygen, the only reaction emission involved is water vapor which is harmless to the environment. This may be compared to gasoline combustion which involves the release of hydrocarbons, carbon monoxide, and complex chemical species into the environment (along with the primary emissions, carbon dioxide and water vapor).

While it has been known that fuel cells offer many advantages as compared to other power sources, particularly in supplying power at remote locations (such as outer space or the like) and offer at least, in principle, limited service and maintenance requirements, various problems are presented by existing fuel cell technology. Nevertheless, perhaps the most advantageous fuel cell systems presently available (for certain applications, at least) are those which utilize a so-called proton-exchange membrane (PEM) electrolyte. Generally, in systems such as this, the electrolyte is embodied in the form of a synthetic polymeric material which acts as an electrolyte while still having the characteristic of being a solid body.

This type of system offers numerous advantages. For example, since the electrolyte phase is solid, no operational complications arise from migration of electrolytic material into adjacent regions of the fuel cell. At the same time, the system is mechanically stable and hardy under a wide variety of operating conditions. Moreover, such fuel cells have the ability to operate at or near room temperature and thus provide virtually instantaneous start-up. In principle, such systems offer the possibility that thermal management may be passively achieved, although practical implementation of this in a wide variety of designs may pose difficult design problems. One such fuel cell is described in Adlhart U.S. Pat. No. 4,175,165 which discloses a stack of grooved bipolar cell plates bolted together and secured with tension straps, a heavy and bulky construction designed to prevent fuel leakage.

Wilson et al. in "High Performance Catalyzed Membranes of Ultra-Low Pt Loadings for Polymer Electrolyte Fuel Cells" J. Electrochem. Soc. vol. 139 No. 2 February 1992 disclose catalyst film and electrolytic membrane structures useful in the practice of this invention. Vanderborgh et al. in a paper prepared for Belvoir Research, Development and Engineering Center, Fort Belvoir, Va. entitled "ANALYSIS OF FUEL CELLS, REACTANT DELIVERY SYSTEMS, AND SYSTEM INTEGRATION FOR INDIVIDUAL POWER SOURCES", numbered "LA-UR-93-345" discuss and disclose ancillary systems and engineering, relating in particular to management of fluids such as coolant air, source gases and moisture, which teaching can also be useful when practicing certain embodiments of this invention.

SUMMARY OF THE INVENTION

In accordance with another aspect of the invention, an easy to manufacture, light-weight fuel cell with structural current collectors is provided. In accordance with this aspect of the invention, a first hollow member is provided defining an interior space and having a peripheral surface. A hydrogen containing gas is received into the interior space, and the hydrogen containing gas is passed from the interior space to the peripheral surface through through-holes or pores of the first hollow member. An anode is formed by wrapping a first conductive winding around the peripheral surface of the first hollow member. The first conductive winding has a catalyst (such as a plating or coating of platinum) effective for decomposing hydrogen molecules from the hydrogen containing gas into hydrogen atoms. An electrolyte member, such as a NAFION (trademark) polymer tube, is disposed around the first conductive winding for passing hydrogen ions therethrough. A cathode is formed by wrapping a second conductive winding around the electrolyte member. The second conductive winding has a catalyst (such as a plating or coating of platinum) effective for decomposing oxygen molecules in an oxygen containing gas into oxygen atoms. A second hollow member for containing the first hollow member, the anode, the electrolyte member and the cathode is provided, and receives the oxygen containing gas.

The first hollow member may be a hollow porous tube, in which case, the hydrogen containing gas is passed from the interior space through the pores in the porous tube and to the peripheral surface. Alternatively, the first hollow member may comprise a hollow tube having through-holes for passing the hydrogen containing gas from the interior space to the peripheral surface. Grooves may be disposed on the peripheral surface in communication with the through-holes (or pores) to facilitate disbursement of the hydrogen containing gas. The hydrogen containing contacts the catalyst of the first conductive winding to decompose the hydrogen molecules in the hydrogen containing gas into atoms. The anode and cathode formed from the first and the second conductive windings may each comprise a conductive wire having a platinum coating or plating. The platinum acts as a catalyst for decomposing hydrogen molecules into $H^+$ ions (at the anode) and $O_2$ molecules into oxygen atoms (at the cathode). The conductive wire may be made from a metal, such as titanium, or may be formed from another suitable organic or inorganic conductive material with adequate strength characterization. The electrolyte member preferably comprises a polymeric material, such as NAFION (trademark), and water. Also, a carbon containing layer may be disposed between the anode and the electrolyte member, and may also be disposed between the cathode and the electrolyte member.

In accordance with another aspect of the invention, a method of making a hydrogen fuel cell is provided in which member a first conductive, catalyst-coated winding is wound around the first hollow member to form an anode. An electrolyte member is formed around the anode by tightly fitting a tube of NAFION (trademark) film around the anode. A second catalyst-coated conductive winding is wound around the electrolyte member. When the electrolyte tube is expanded by water the electrolyte member is tightly sandwiched between, and in intimate contact with, the first conductive winding forming the anode and the second conductive winding forming the cathode. A second hollow member for containing the first hollow member, the anode, the electrolyte member and the cathode is assembled therewith for receiving the oxygen-containing gas.

SUMMARY OF THE INVENTION

The invention, as claimed, is intended to provide a remedy. It solves the problem of providing a hydrogen fuel cell utilizing a solid Pro-Exchange Membrane electrolyte. The inventive hydrogen fuel cell comprises a first anode comprising a porous electrically conductive member and having a first end and a second end. The second end of the first anode is positioned opposite the first end of the first anode. A first electrolytic member is disposed over and in facing contacting relationship to at least a portion of the first anode. The first electrolytic member has a first end proximate the first end of the first anode and a second end proximate the second end of the first anode. A first cathode has first and second ends, and comprises a porous electrically conductive member. The first cathode is disposed over and in facing contacting relationship to the first electrolytic member. At least a portion of the first cathode member is in facing relationship to a portion of the first anode member. The first end of the first cathode is facing the first end of the first anode and the second end of the first cathode is facing the second end of the first anode. A second anode comprises a porous electrically conductive member having a first end and a second end. The second end of the second anode is positioned opposite the first end of the second anode. The second anode is positioned in spaced relationship to the first anode with the second end of the first anode proximate and spaced from the first end of the second anode. A second electrolytic member is disposed over and in facing contacting relationship to the second anode. The second electrolytic member has a first end proximate the first end of the second anode and a second end proximate the second end of the second anode. A second cathode has first and second ends. The second cathode is made of an electrically conductive air permeable material. The second cathode is disposed over and in facing contacting relationship to the second electrolytic member. The first end of the second cathode is proximate the first end of the second electrolytic member and the second end of the second cathode is proximate the second end of the second electrolytic member. An electrically conductive bridge extends from the second end of the first anode to the first end of the second cathode.

The following four paragraphs were added January 1993

A further aspect of the invention provides a hydrogen fuel cell having a layered electrode structure said fuel cell comprising:

a) a layered porous anodic electrode;

b) ducting to supply hydrogen to said porous anodic electrode;

c) a layered porous cathodic electrode exposable to oxygen;

d) a layered electrolytic member between and in contact with said anode and with said cathode for transporting ions therebetween;

e) catalytic means at said anodic and said cathodic electrodes for ionizing hydrogen and oxygen respectively;

f) a support for said electrolytic structure, said support engaging one of said electrodes; and g) restraining means engaging said electrodes to constrain said electrolytic member between and in contact with said electrodes;

wherein said restraining means acts to displace transverse swelling of said electrolytic member in directions generally parallel to said layered electrodes.

In another aspect the invention provides a fuel cell having an electrolytic structure, comprising:

a) a porous anodic electrode;

b) ducting to supply hydrogen to said porous anodic electrode;

c) a porous cathodic electrode exposable to oxygen;

d) a selectively permeable thin-layer electrolytic member between and in contact with said anode and with said cathode for transporting hydrogen ions therebetween; and e) an electrolytic sealant between at least one of said electrodes and said electrolytic member;

wherein said sealant bonds said at least one electrode to said electrolytic member with occlusion of voids over a substantial area to provide good electrolytic contact therebetween, said sealant being a polymeric material deposited in situ from a liquid phase.

In a still further aspect the invention provides a hydrogen fuel cell comprising a self-supporting shaped, layered electrode structure in which a solid-phase proton-transporting electrolyte is sandwiched between a porous anode and a porous cathode, said structure being shaped to provide an enclosed chamber having a mouth through which hydrogen can be admitted to said chamber, said fuel cell further comprising a base closing said mouth and carrying a hydrogen supply and electrical connections to said electrode structure.

The invention also provides a method of manufacturing a hydrogen fuel cell comprising a self-supporting shaped, layered electrode structure in which a solid-phase proton-transporting electrolyte is sandwiched between a porous anodic electrode and a porous cathodic electrode, comprising the steps of a) coating a first, shaped self-supporting electrode with a curable, liquid-phase, proton-transporting electrolytic material to provide an electrolytic coating;

b) curing said electrolytic coating to the solid phase;

c) assembling said coated electrode with a second, mating, shaped electrode to provide said layered structure;

d) and assembling said electrode structure with a support base.

BRIEF DESCRIPTION OF THE DRAWINGS

One way of carrying out the invention is described in detail below with reference to drawings which illustrate only specific embodiments of the invention and in which:

FIG. 11 is a side view of the embodiment of FIG. 10;

FIG. 12 is an exploded perspective view of the embodiment of FIG. 10;

FIG. 13 is a vertical section through another, in this case tubular, fuel cell embodiment of the invention;

FIG. 14 is a schematic perspective view of an array of tubular fuel cells according to the embodiment shown in FIG. 13;

FIG. 15 is a partial sectional view similar to FIG. 4 of another embodiment of a layered fuel cell employing an adhesive between the layers;

FIG. 16 is a vertical section through another, in this case conical, fuel cell embodiment of the invention; and FIG. 17 is a schematic sectional view of a modified embodiment of the fuel cell of FIG. 16 employing a view on the line 17—17 of FIG. 16;

FIG. 18 is an enlargement of a detail of FIG. 17;

Figure 19:
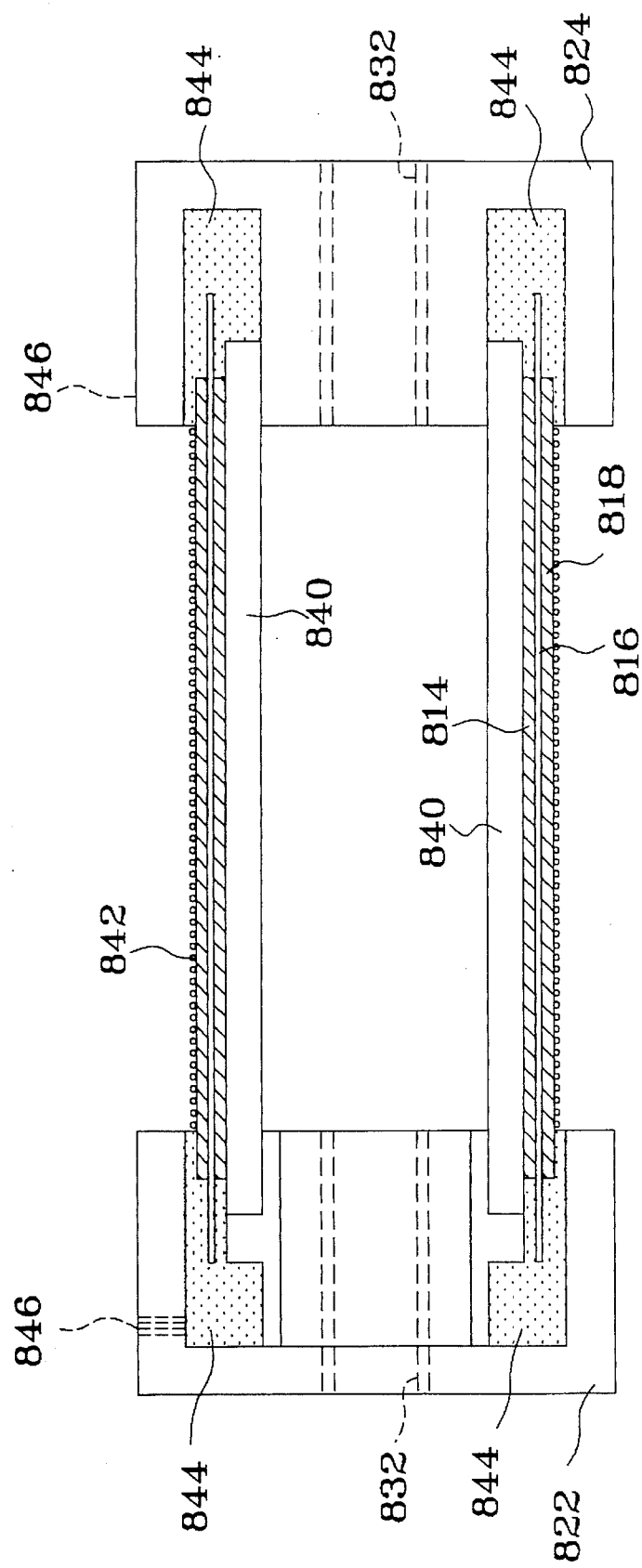
Figure 20:
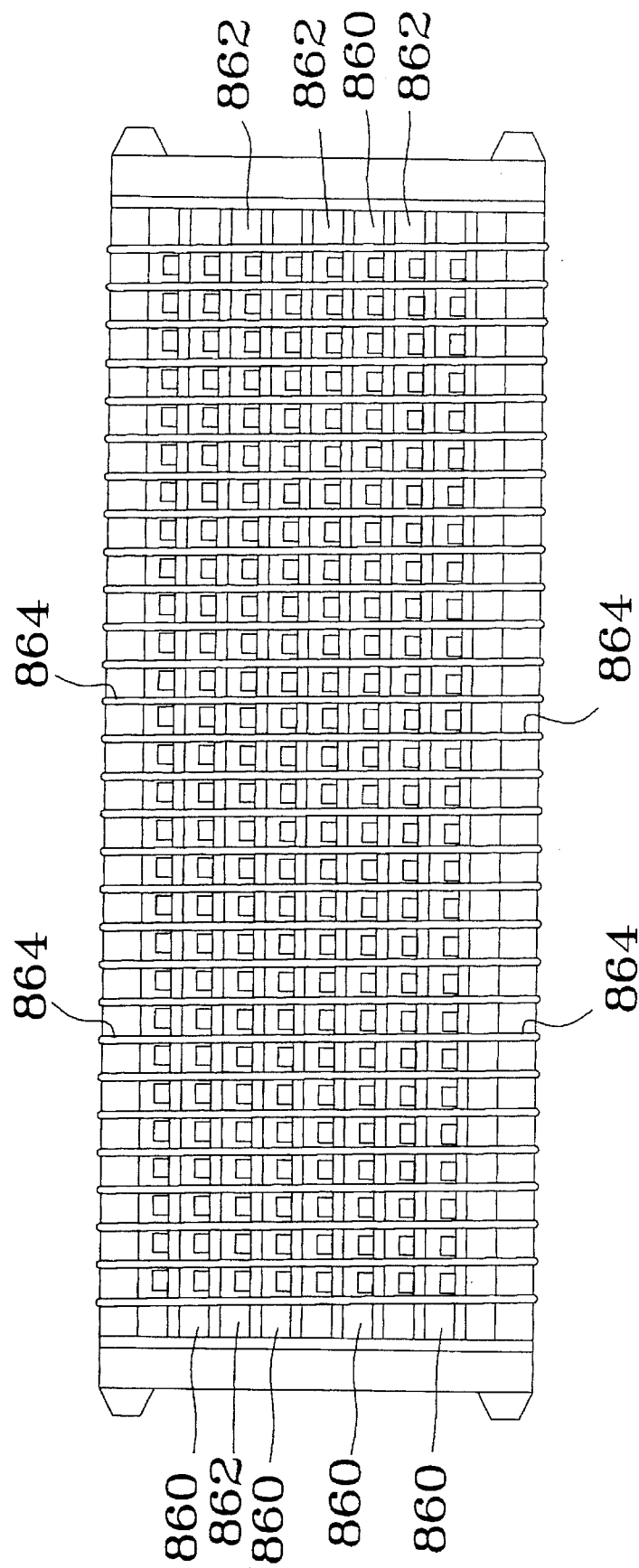

The drawings and description of the embodiments of FIGS. 19 to 33(a)–(f) are newly added to this specification in August 1994, although the embodiments of FIGS. 19–20 were first disclosed in my international PCT application No. WO 94/05051 published on 3 Mar. 1994.

Figure 13:
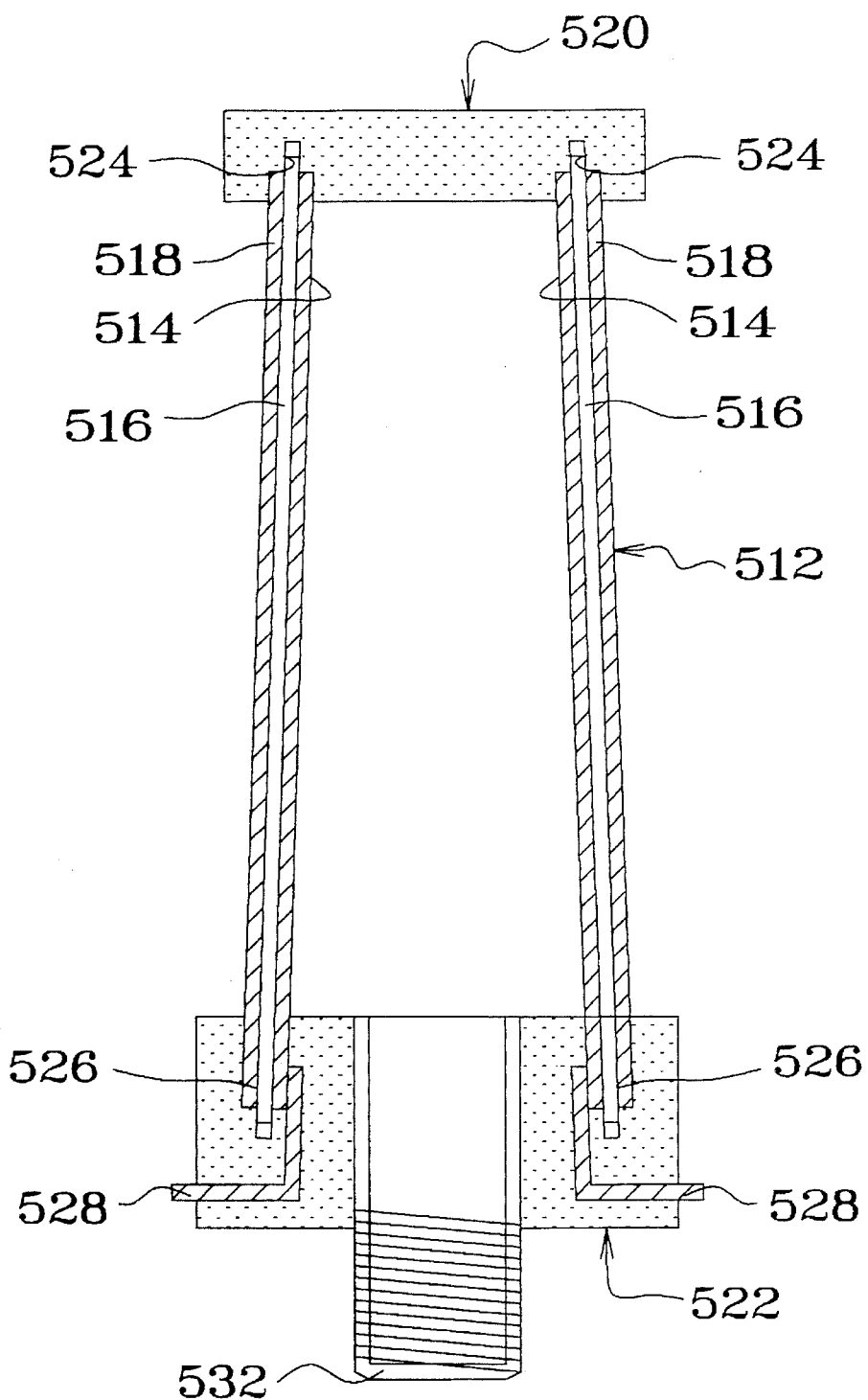
(FIGS. 13–18, and the description relating thereto, are added February 1993)
Figure 21A:
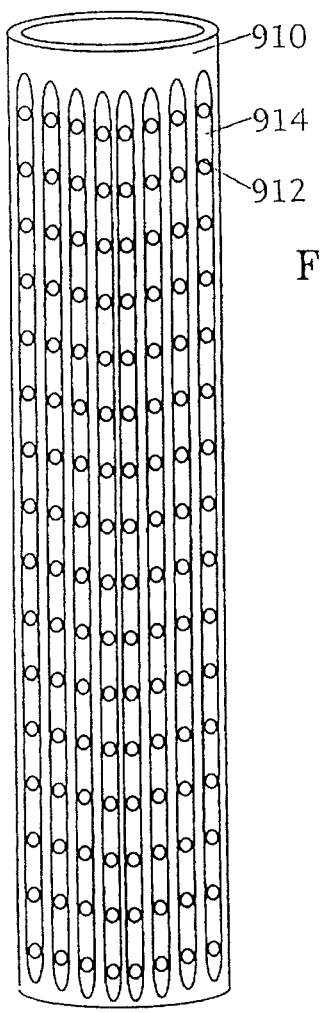
Figure 22A:
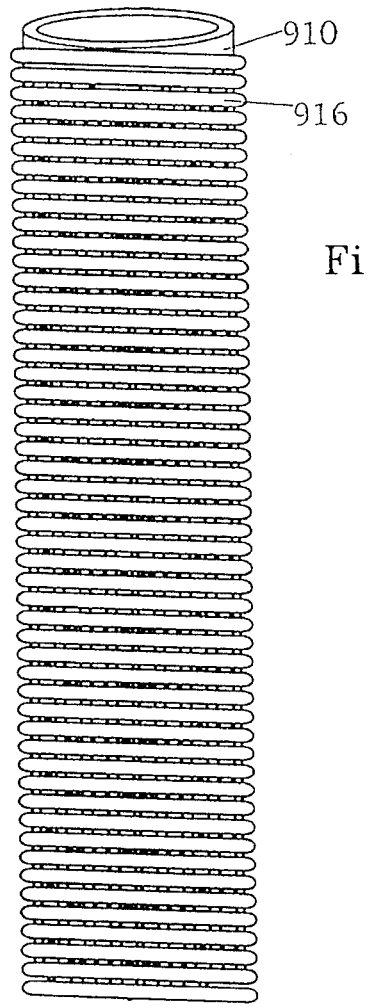
Figure 21B:
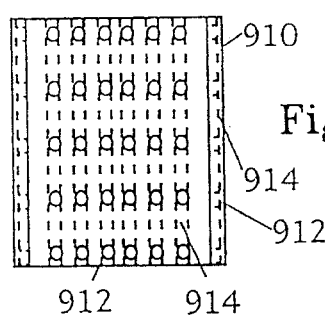
Figure 22B:
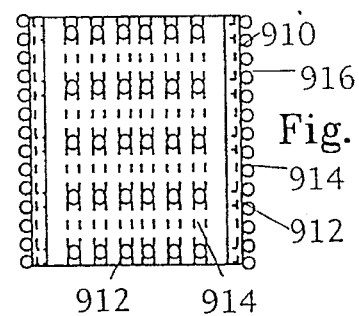
Figure 25A:
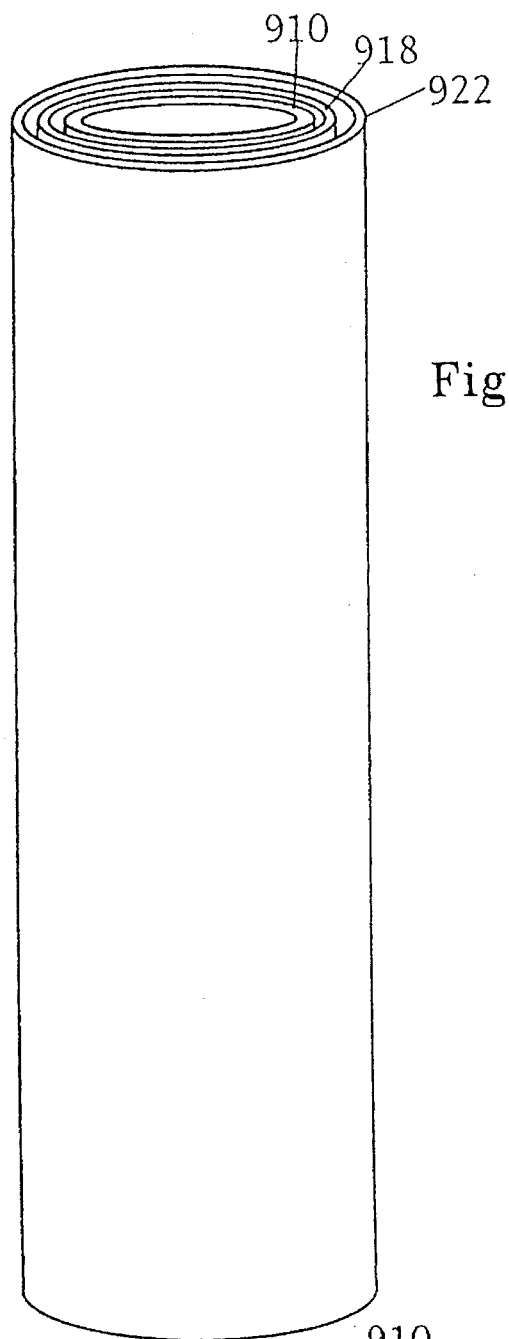
Figure 25B:
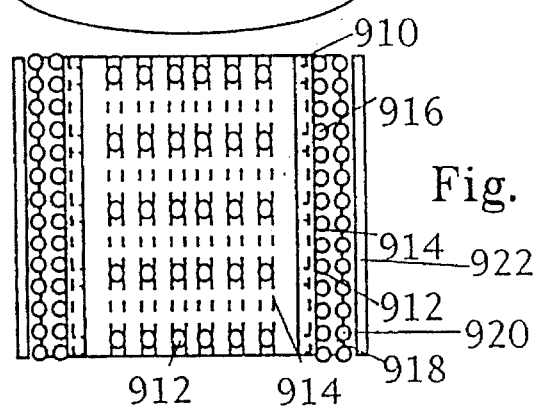
Figure 28:
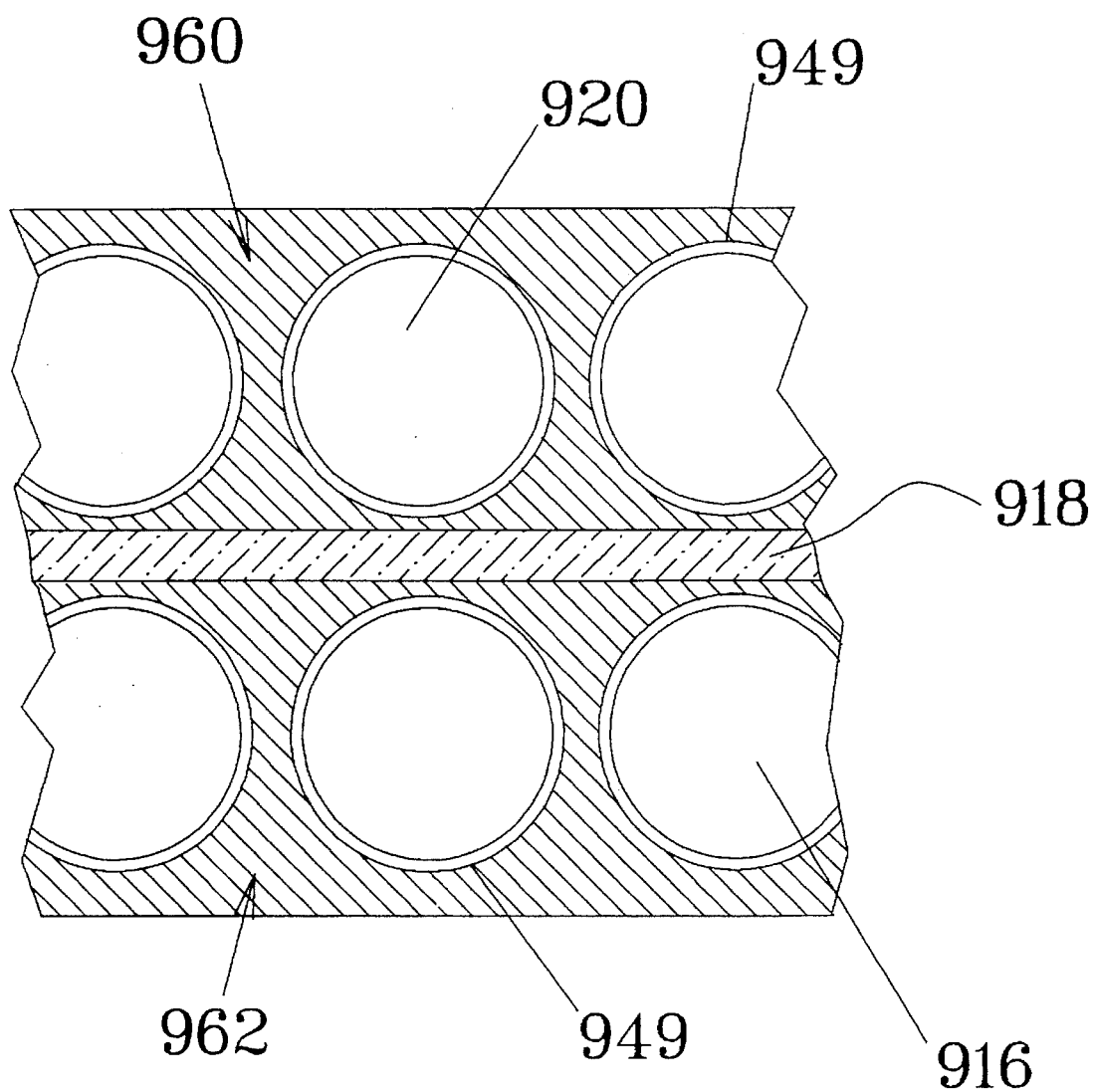
Figure 28A:
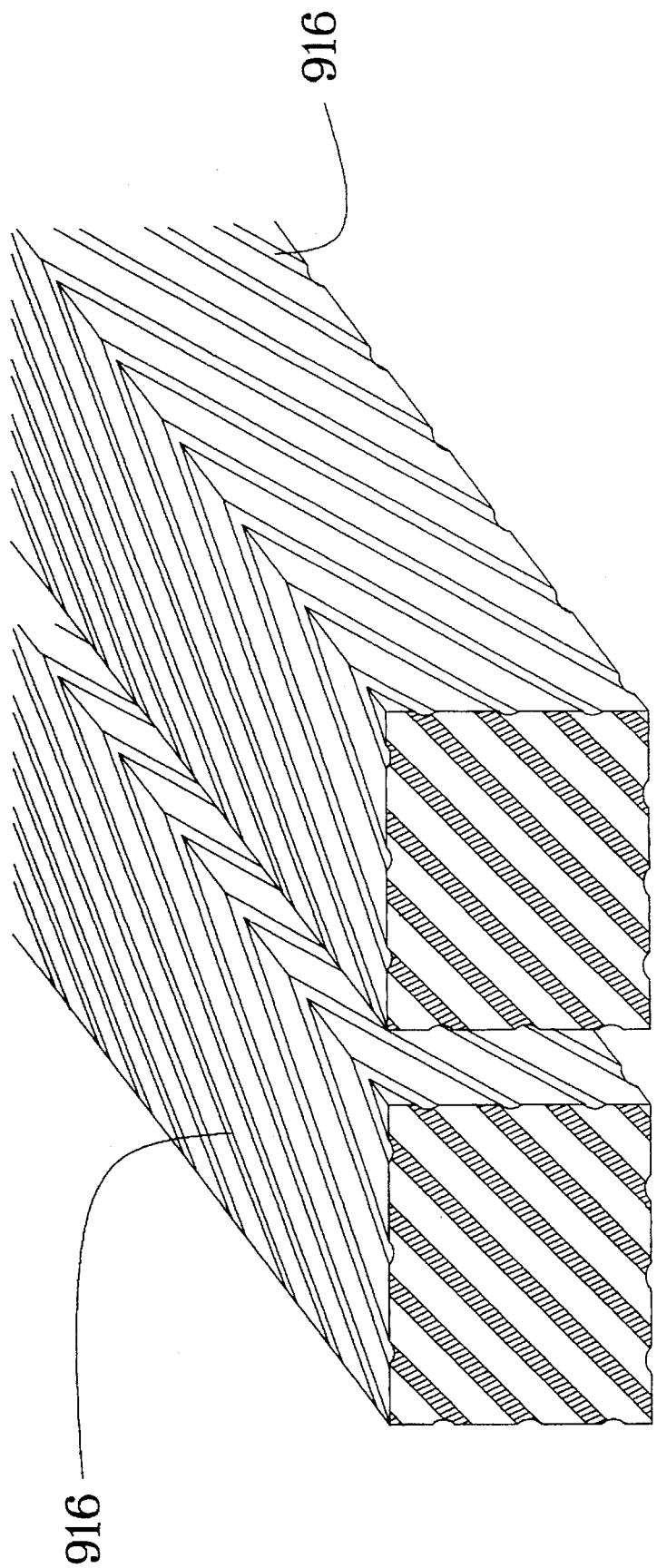
Figure 29:
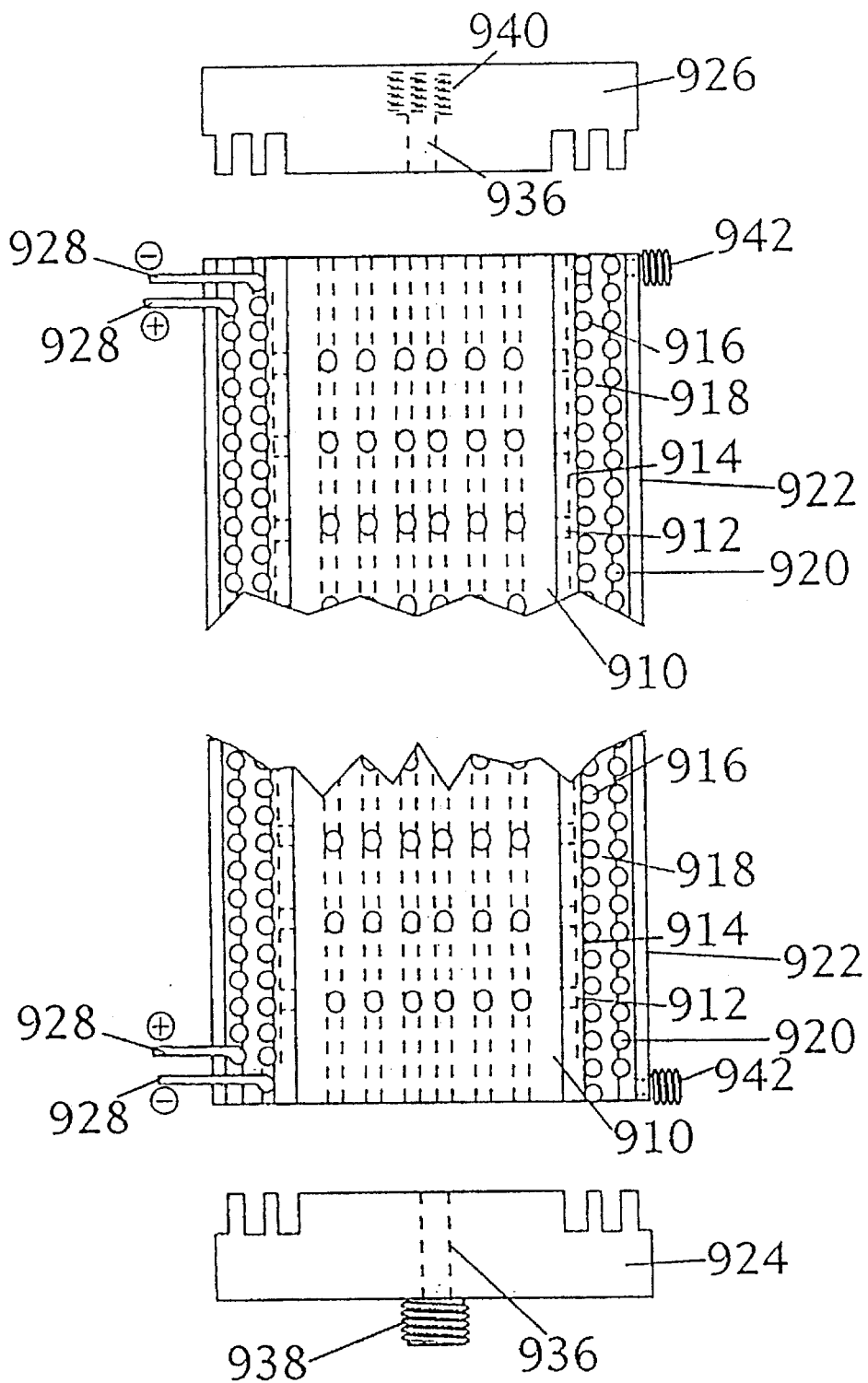
Figure 30D:
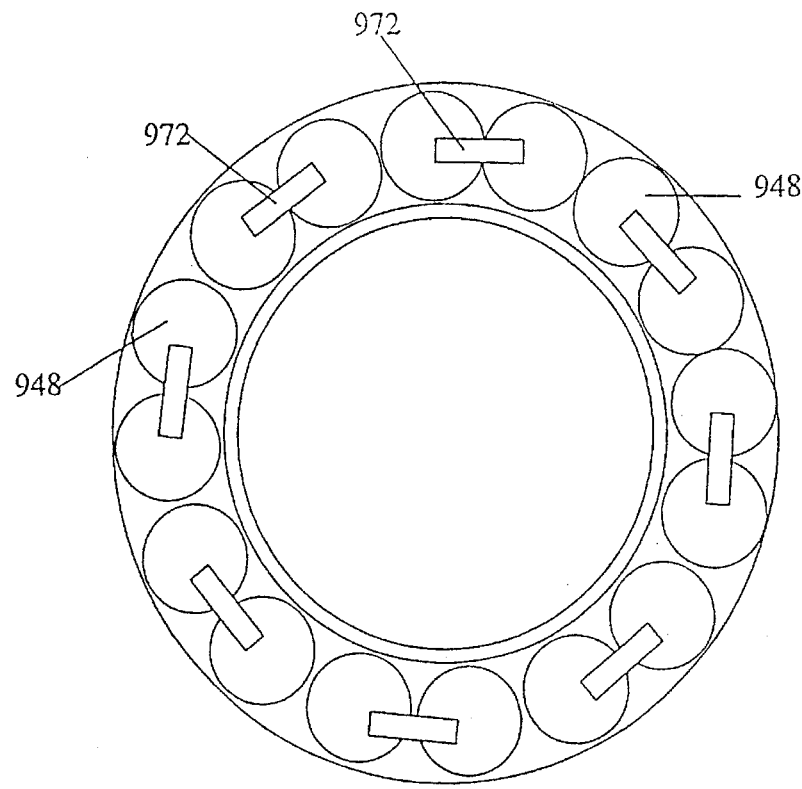
Figure 30C:
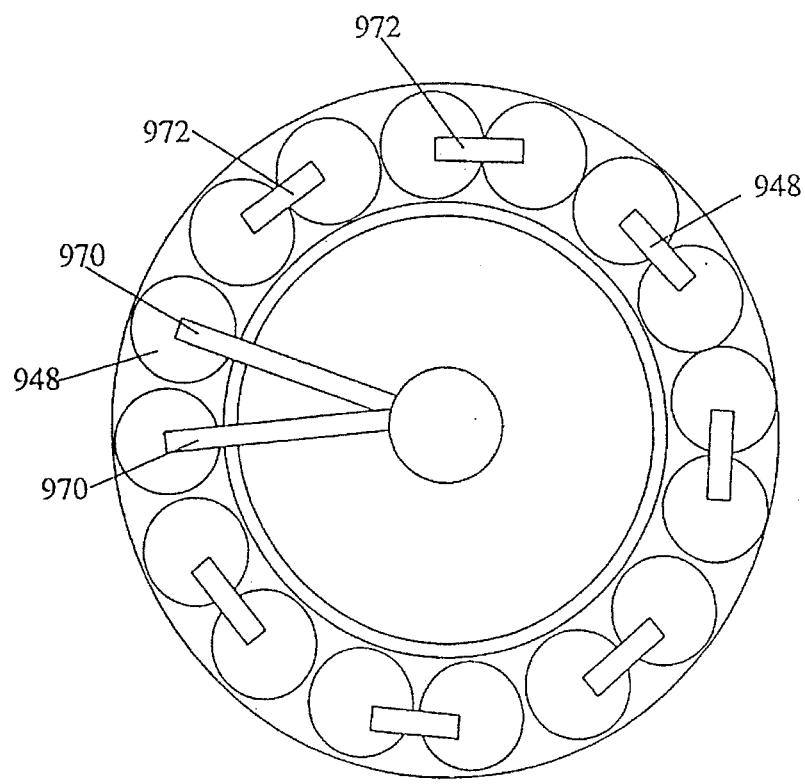
Figure 31C:
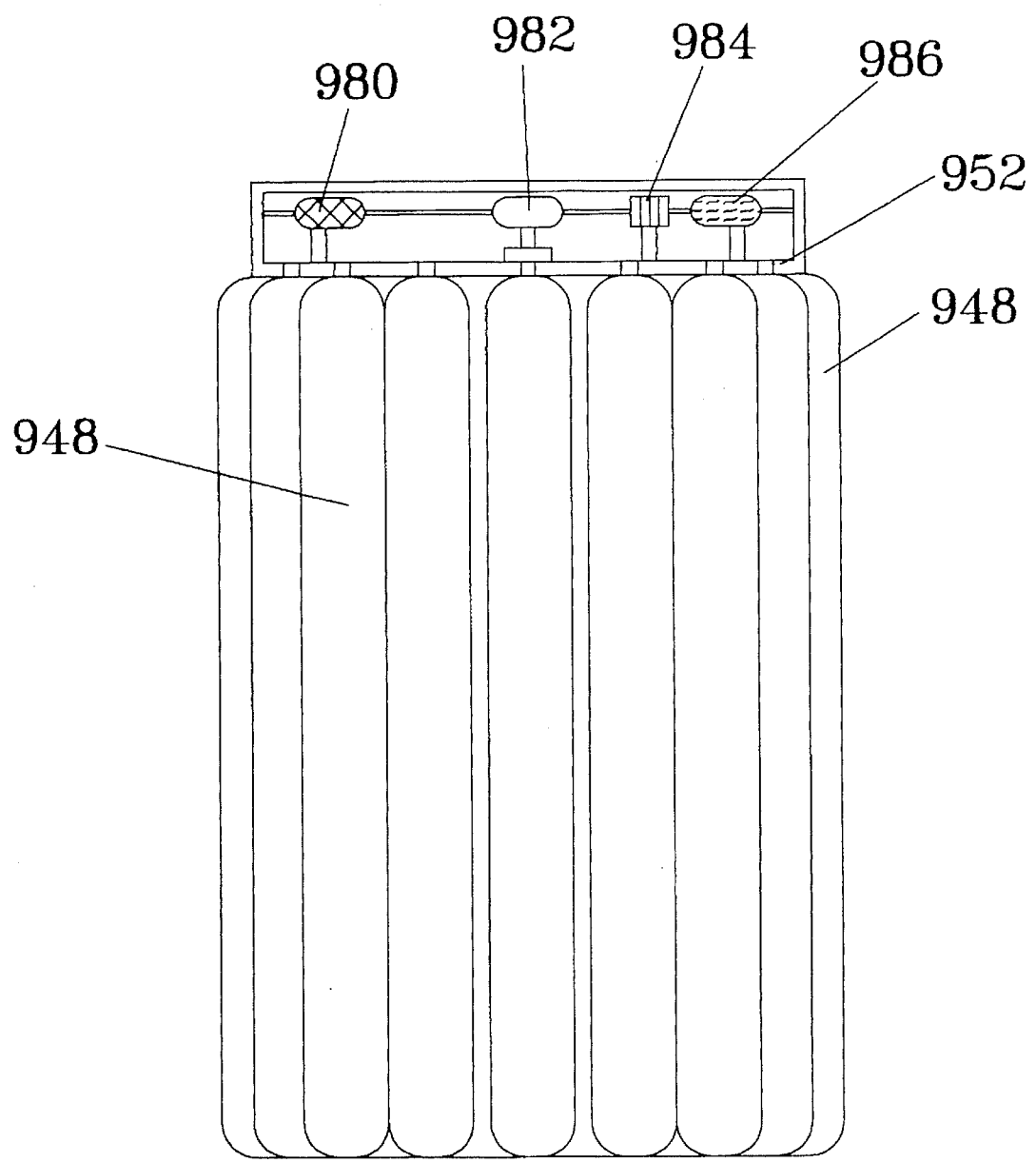
Figure 32:
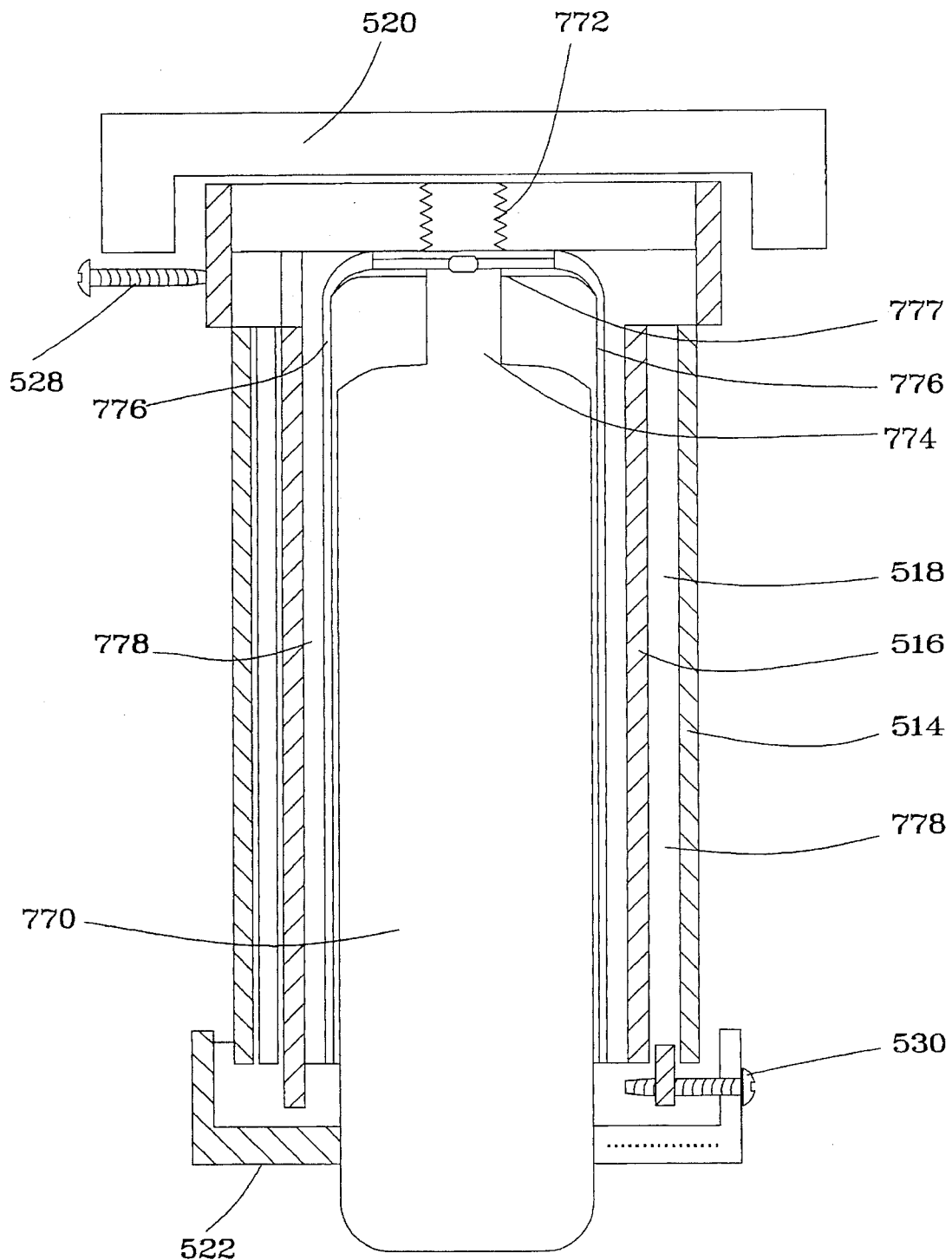
Figure 33A:
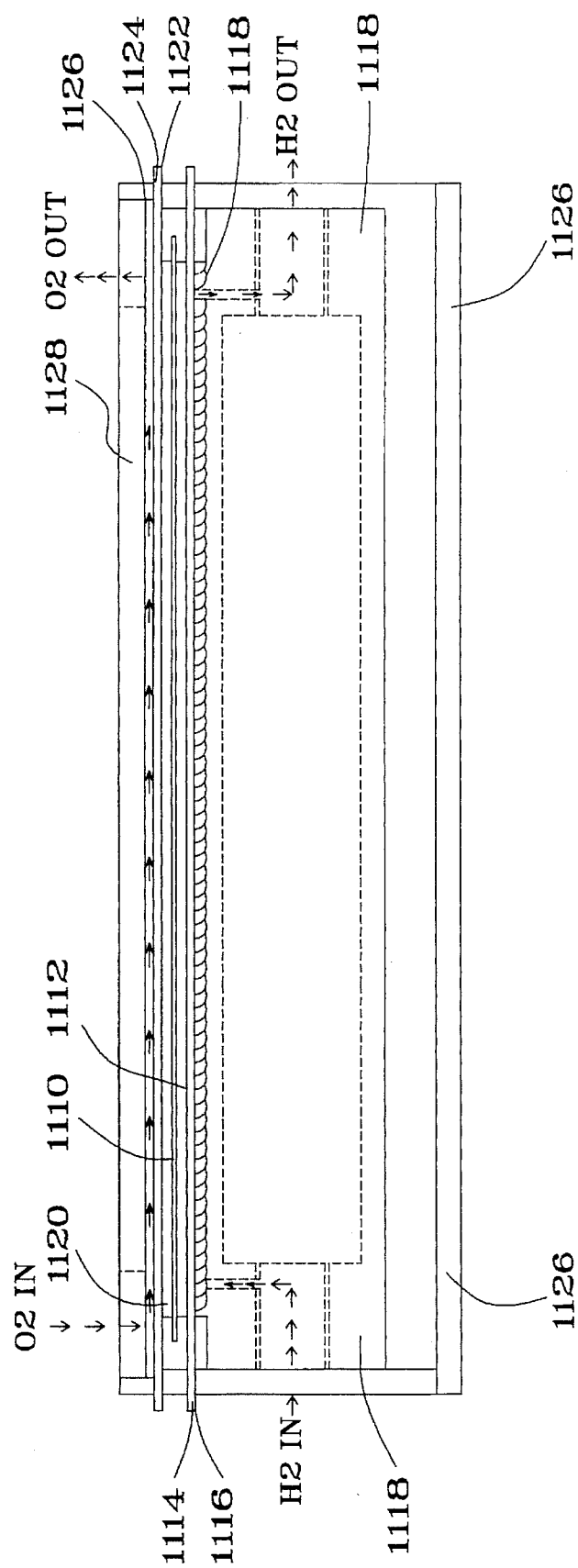
Figure 33B:
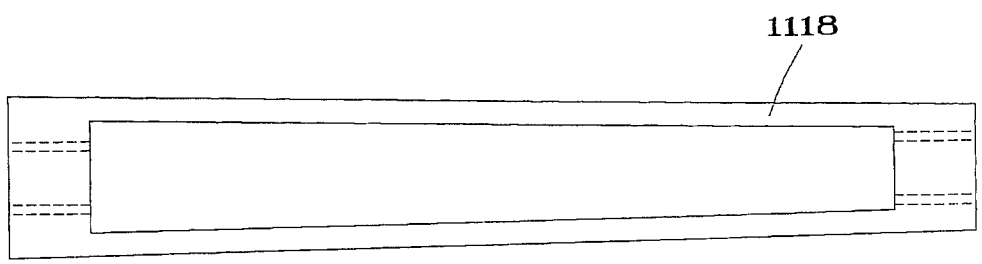
Figure 33C:
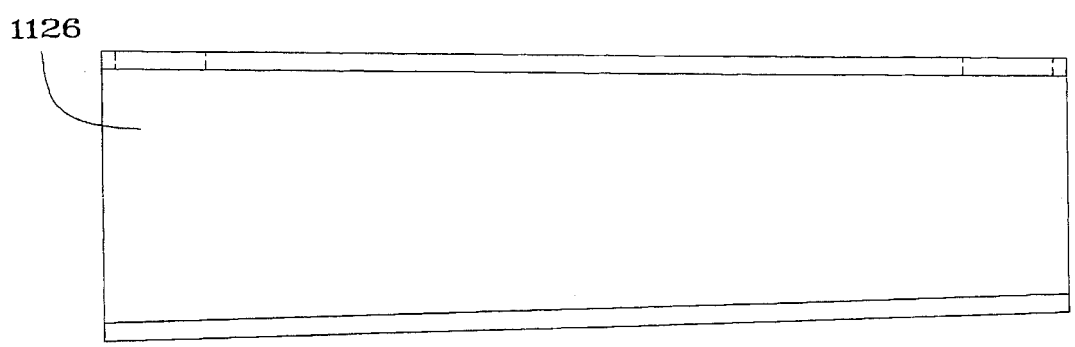
Figure 33D:
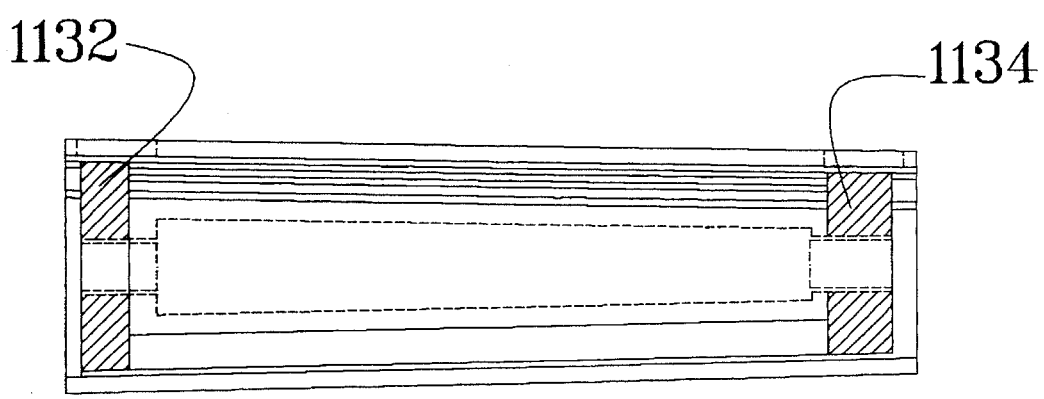
Figure 33E:
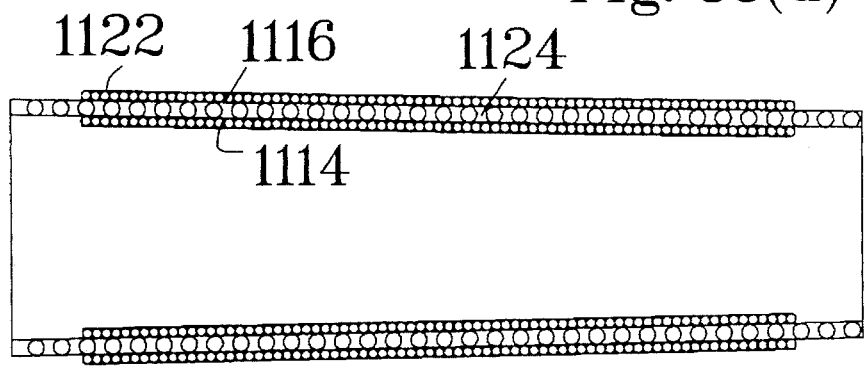
Figure 33F:
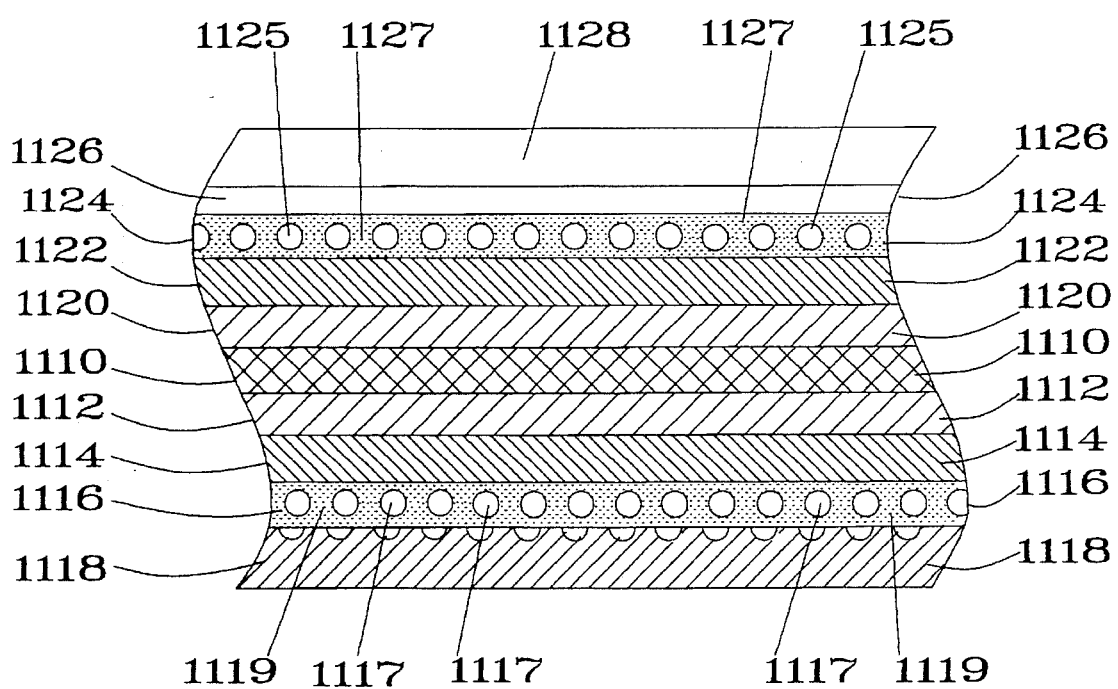

FIG. 19 is a view similar to FIG. 13 of a modified embodiment of fuel cell;

FIG. 20 is a side elevation of a stacked flat fuel cell assembly according to a still further embodiment of the invention;

FIG. 21(a) is a perspective view of a first hollow member in accordance with another embodiment of the inventive hydrogen fuel cell;

FIG. 21(b) is a cross-sectional view of the first hollow member shown in FIG. 21(a);

FIG. 22(a) is a perspective view showing a first conductive winding wound around the first hollow member shown in FIG. 21(a);

FIG. 22(b) is a cross-sectional view of the first hollow member and the first conductive winding shown in FIG. 22(a);

FIG. 23(a) is a perspective view showing an electrolyte member disposed around the first conductive winding;

FIG. 23(b) is a cross-sectional view of the electrolyte member, the first conductive winding and the first hollow member shown in FIG. 23(a);

FIG. 24(a) is a perspective view showing a second conductive winding wrapped around the electrolyte member;

FIG. 24(b) is a cross-sectional view of the second conductive winding, the electrolyte member, the first conductive winding and the first hollow member shown in FIG. 24(a);

FIG. 25(a) is a perspective view showing a second hollow member disposed around the second conductive winding;

FIG. 25(b) is a cross-sectional view showing the second hollow member, the second conductive winding, the electrolyte member, the first conductive winding and the first hollow member shown in FIG. 25(a);

FIG. 26(a) is a cross-sectional view showing male and female end caps prior to installation on the inventive hydrogen fuel cell;

FIG. 26(b) is a cross-sectional view of a male end cap modified for series connection;

FIG. 27 is a cross-sectional view showing two joined adjacent hydrogen fuel cells;

FIG. 28 is an isolated enlarged view schematically showing the first conductive winding, the electrolyte member and the second conductive winding;

FIG. 28(a) is a perspective view of a modified conductive winding;

FIG. 29 is a cross-sectional view showing male and female end caps prior to installation in accordance with an alternate construction;

FIG. 30(a) is a top plan view of a multiple fuel cell assembly in accordance with another aspect of the present invention;

FIG. 30(b) is a bottom plan view of the multiple fuel cell assembly shown in FIG. 30(a);

FIG. 30(c) is a view similar to FIG. 30(a) of another embodiment of fuel cell assembly;

FIG. 30(d) is a view similar to FIG. 30(c) of the fuel cell assembly of FIG. 30(c);

FIG. 31(a) is an isolated side plan view showing the fuel cells of the multiple fuel cell assembly shown in FIG. 30(a);

FIG. 31(b) is an isolated side plan view showing a hydrogen gas supply tank of the multiple fuel cell assembly shown in FIG. 30(a);

FIG. 31(c) is a schematic view similar to FIG. 31(a) of a multiple fuel cell assembly equipped with fluid flow management means;

FIG. 32 is a vertical cross-sectional view of a portable hydrogen fuel cell designed to accommodate its own hydrogen supply in the form of a quick release hydrogen bottle;

FIG. 33(a) is a schematic sectional views of a further embodiment of tapered tubular fuel cell;

FIG. 33(b) is a schematic view of an inner housing component of the fuel cell shown in FIG. 33(a);

FIG. 33(c) is a schematic view of an outer housing component of the fuel cell shown in FIG. 33(a);

FIG. 33(d) is a similar view of the fuel cell of FIG. 33(a) after application of seals of to the ends of the cell;

FIG. 33(e) is an alternative embodiment of electrode diffusion tube for use in the fuel cell assembly of FIG. 33(a); and FIG. 33(f) is an enlarged partial sectional view of the layered wall structure of the fuel cell of FIG. 33(a).

DETAILED DESCRIPTION OF THE PREFERRED EMBODIMENTS

Figure 1:
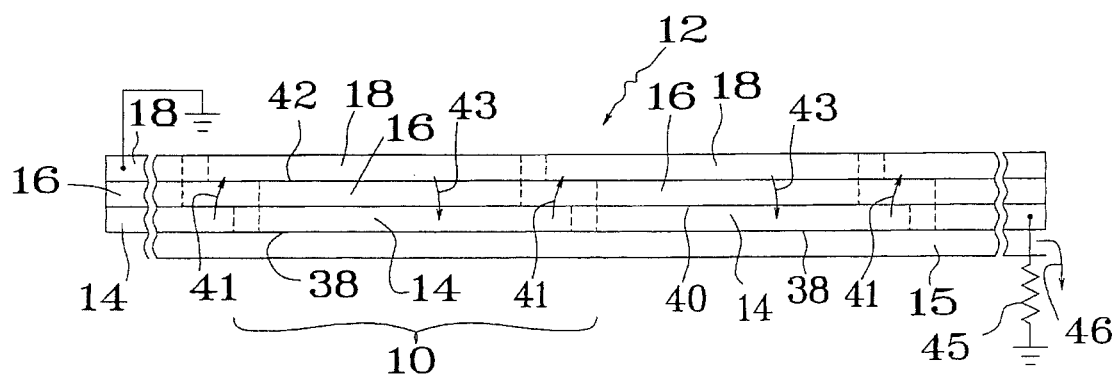
FIG. 1 is a schematic representation of a fuel cell, constructed in accordance with the present invention.
Figure 2:
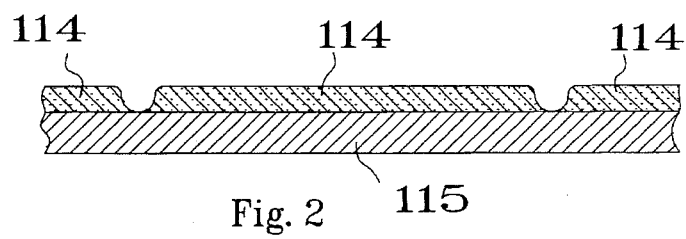
FIGS. 2–4 illustrate successive steps in the fabrication of a power cell in accordance with the invention.
Figure 3:
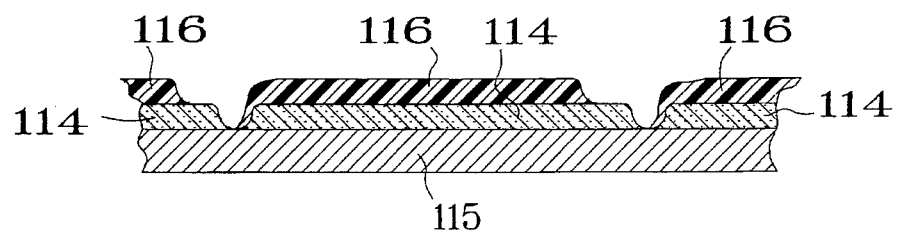

Referring to FIG. 1, a hydrogen powered electricity generating cell 10 incorporating the present invention, as appears more fully below, is illustrated. Cell 10 includes a plurality of layers of planar members each having relatively small thickness and an active area of approximately 75 square centimeters, being about 10 cm. long and 7.5 cm. wide. A single cell 10 has the capacity of generating approximately three watts at approximately 0.7 volts.

An actual power source 12, as illustrated in FIG. 1, comprises a plurality of cells 10 which are disposed in edgewise surface-to-surface contact with each other. This results in effectively putting the cells in series. In a preferred arrangement, seventeen cells thus connected will generate a voltage equal to the voltage of an individual cell multiplied by the number of cells in the power source 12, or about 12 volts.

Each cell 10 comprises an anode 14, which comprises a material, such as carbon fiber cloth or paper, that conducts electricity and is porous enough to pass hydrogen. Such carbon fiber paper is a paper-like product made of compacted graphite fibers which is available from numerous sources including the Toray Company of Tokyo, Japan. Suitable materials are Kreha 400 and Toray TGP. Anode 14 is supported on a substrate 15 which is made of screening, porous paper or any material capable of passing hydrogen gas. Anode 14 has a thickness of 0.01 to 0.05 cm. An electrolyte member 16 is disposed in contact with anode 14. Electrolyte member 16 is made of a solid polymeric material, which is especially designed for use as an electrolyte, and may be of the type sold by the du Pont Company of Wilmington, Del. under the trademark NAFION. Electrolyte member 16 has a thickness of 0.001 to 0.020 cm. In order to function efficiently as an electrolyte, electrolyte member 16 must have a high water content.

The next layer in cell 10 is a cathode 18, another layer incorporating a so-called carbon paper sheet. Cathode 18 also has a thickness of 0.01 to 0.05 cm.

During operation of the inventive cell, hydrogen is supplied through gas permeable substrate 15 to anode 14. Naturally, depending upon materials used, the structure may be strong enough to function without having a substrate. Because anode 14 is made of compacted graphite fibers, it is largely gas permeable and the hydrogen is caused to migrate from the input face 38 of anode 14 to its output face 40. The fibers of anode 14, which are in the region adjacent to output face 40 have a quantity of platinum or other suitable catalyst deposited thereon. Such deposition may be achieved by co-depositing the platinum (as platinum-black particles or supported on conductive carbon particles) with a polymeric material such as Teflon plastic, such polymeric material serving as a binder for the platinum (or platinum-containing) particles and as a hydrophobic agent to prevent accumulation of water in the catalyst layer.

Because of the presence of the catalyst platinum, hydrogen molecules reaching the region of anode 14 adjacent face 40 and substantially in contact with the electrolytic layer 16 are decomposed into hydrogen atoms and have their electrons stripped, resulting in the formation of H+ ions. These ions are able to penetrate through the Nafion electrolytic layer of electrolyte member 16. Thus, a continuous flow of hydrogen to electrolyte member 16 is achieved.

In similar fashion, oxygen (which may be mixed with other gases and in the form of ambient air) is caused to flow through cathode 18. Cathode 18, because it is made of compacted carbon or graphite fibers is permeable to oxygen, resulting in oxygen advancing toward the opposite side of electrolyte member 16 adjacent cathode 18.

Here again, the face 42 of cathode 18 has its surface impregnated with a deposit of platinum or other suitable catalyst. The result is that the oxygen molecules are broken down into oxygen atoms in the presence of the catalyst and accept electrons from the external circuit while reacting with H+ ions reaching these sites from electrolyte member 16, thereby forming water.

During cell operation, electrons created by the dissociation of the hydrogen molecules and atoms due to the action of the catalyst at the output face 40 of the anode, are available and are sent via an external circuit to a load 45 as illustrated in FIG. 1. Electrons follow the circuit path in the direction indicated by arrow 46. These electrons, after they pass through load 45, become associated with the oxygen atoms created by the platinum at the output face 42 of the cathode 18. This, along with reaction with the H+ ions from electrolyte member 16, results in the formation of water molecules. This ongoing reaction continues to draw hydrogen ions created at the output face 40 of the anode 14 through electrolyte member 16 to the catalyst at cathode output face 42.

As can be seen in FIG. 1, all layers of cell 10 are electrically conductive, either electronically or ionically. This includes the anode, the electrolyte, and the cathode.

Thus, obtaining higher voltages from a cell is merely a matter of extending the length of the power source 12 with the configuration illustrated in FIG. 1 (series-connected). Generally the anode 18 of one cell 10 is connected to the cathode 14 of the next adjacent cell in the series, resulting in current flow in the direction indicated by arrows 41 between cells and arrows 43 through each cell 10.

A method of working an alternative embodiment of the invention is illustrated in FIGS. 2–5. Generally, similar parts or parts performing analogous, corresponding or identical functions to those of the FIG. 1 embodiment are numbered herein with numbers which differ from those of earlier described elements by multiples of one hundred.

In accordance with one embodiment of the invention, a web or substrate 115 is made of a highly air permeable material in the form of a long sheet member large enough to form the desired number of cells. An anode 114 is formed by depositing graphitic or other suitable material in liquid form on web 115, using a silk-screen or another suitable process. This forms the structure of FIG. 2. Such material may be a suspension of graphite fibers and carbon block in a plastic and solvent solution, which, when it evaporates, will leave a matrix of graphite fibers secured to each other by conductive plastic. The resulting structure will thus have the properties of electrical conductivity and air permeability.

Figure 4:
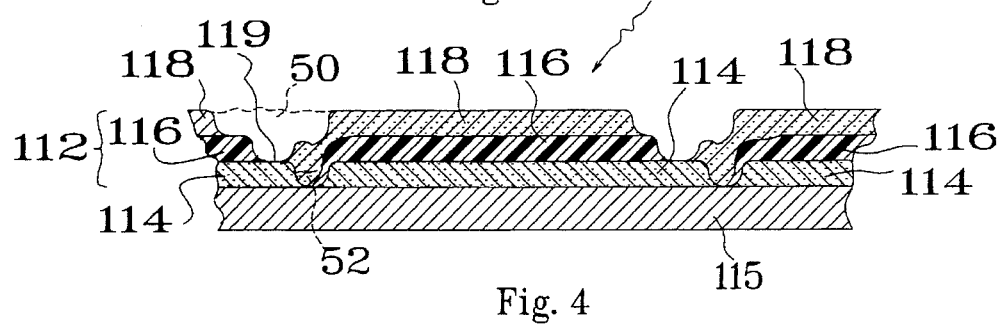

After deposition of anodes 114 in automated sequential fashion, Nafion electrolytic plastic is next deposited to form an electrolytic member 116. Again deposition of the material is done in liquid form, using a silk-screen or other automated process, to form the structure of FIG. 3. Referring to FIG. 4, the cells 110 are completed with the deposition of cathodes 118, using the same materials as were used to form anodes 116 and with a small overlap over the exposed edge 119 of anode 116 to make the connection between anode and cathode of adjacent cells in the series circuit.

Figure 5:
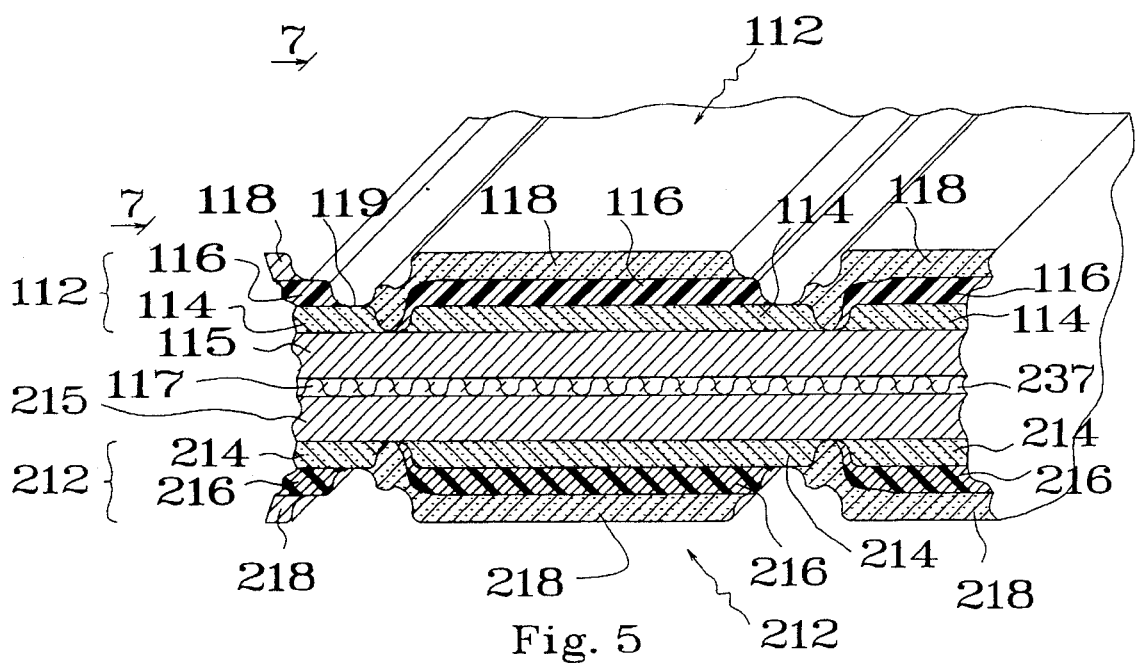
FIG. 5 shows an alternative embodiment of the invention.
Figure 7:
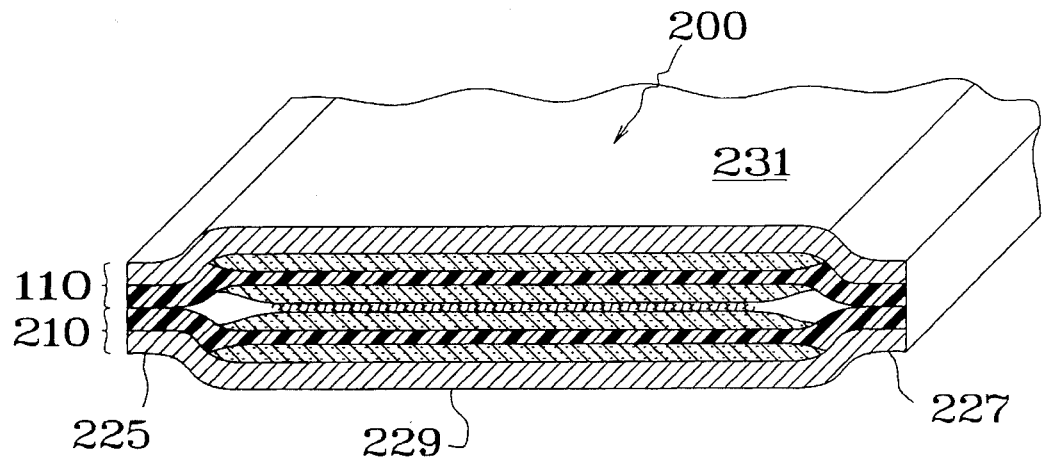
FIG. 7 is a view along lines 7—7 of FIG. 5 at a different scale for clarity of illustration.
Figure 6:
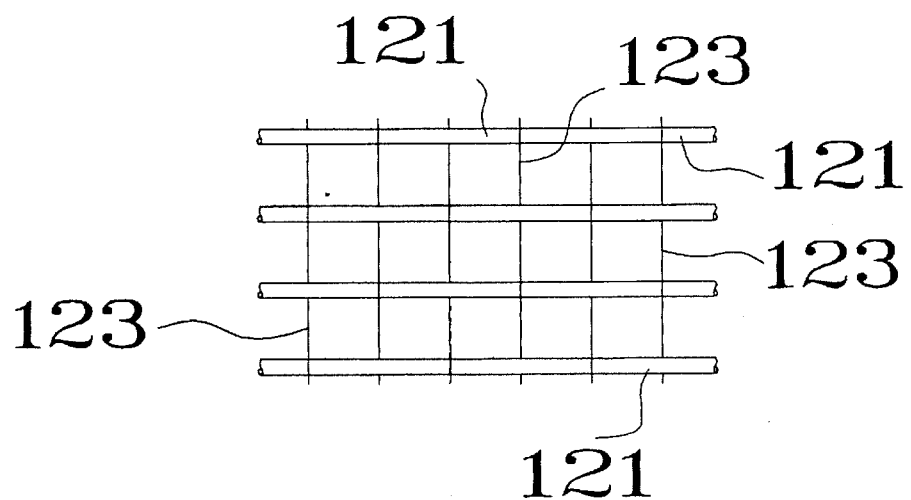
FIG. 6 illustrates a part of the embodiment of FIG. 5.

A particularly advantageous structure is illustrated in FIGS. 5–7. Here two batteries 112 and 212 are in facing relationship to each other to form a single power cell. Batteries 112 and 212 are separated by a screen 117 or other planar member which allows hydrogen to pass to facing substrate 115 and 215 to reach anodes 114 and 214. Screen 117 may be of conventional design, or, as illustrated in FIG. 6, may have thick members 121 and transverse thin members 123. Thick members 121 are oriented to extend in the direction of hydrogen flow through the system.

Figure 8:
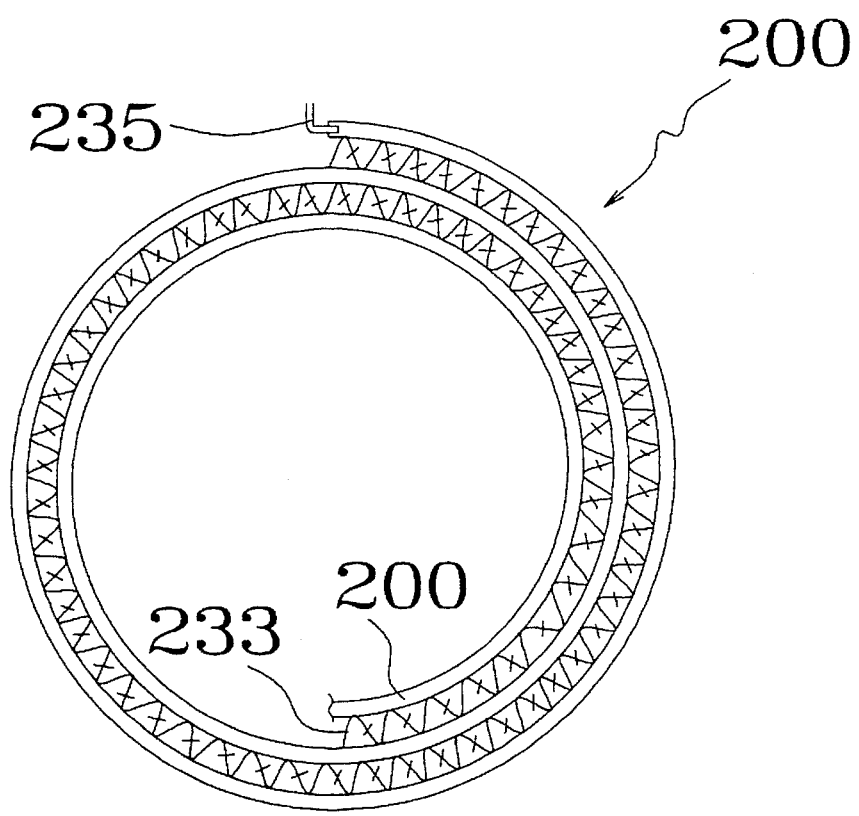
FIG. 8 illustrates a spiral configuration for the fuel cell of FIG. 5.

In accordance with a preferred embodiment of the invention two elongated batteries 112 and 212 are disposed one facing the other over their entire identical lengths, as illustrated in FIG. 5. To keep hydrogen in the system, the two cells 110 and 210 are sealed along their edges 225 and 227 as illustrated in FIG. 7, to form a power system 200. If desired, power system 200 may be rolled into a cylinder as illustrated in FIG. 8. Because oxygen must enter both exposed faces 229 and 231, a separator screen 233 must be wound with power system 200, as it is put in the form of a cylinder.

During operation, hydrogen gas is introduced into the system 200, via an inlet 235, as illustrated in FIG. 8. Referring to FIG. 5, hydrogen enters the space 237, through which it migrates through substrate 115 and 215 to each anodes 114 and 214, respectively. The hydrogen then passes through the electrodes to their respective electrolytic layers 116 and 216, which pass hydrogen ions to their respective cathodes 118 and 218, resulting in an accumulation of electrons at the anode and a shortage of electrons at the cathode. At the cathode interface with the electrolyte, the hydrogen ion meets the oxygen which passed through screen 233, forming water which passes out of the cathode to screen 233 where it is allowed to escape.

In a typical 50 watt fuel cell operating at 12 volts, at 0.7 volts per cell, seventeen cells are required. Given the typical 35 watts/sq. ft., 1.43 sq. ft. are required. At a three inch width, a four inch cell length is required. With a 0.25 inch gap between cells, total cell length is 4.25 inches. With the construction of FIG. 5, a three foot length is required. For a roll with an inner diameter of three inches, and an outer diameter of four inches the total assembly has a four inch outer diameter and a three inch width.

Figure 9:
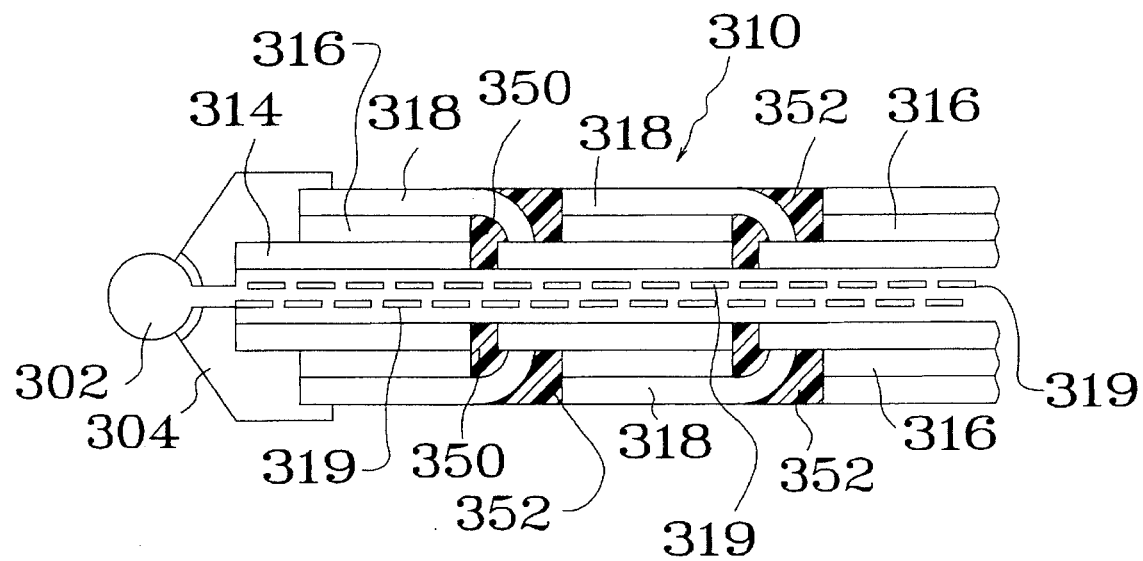
FIG. 9 is a schematic view of an alternative embodiment.

Referring to FIG. 9, an alternative embodiment of the system of the present invention is schematically illustrated. In this embodiment the cell 310 has improved gaseous fuel handling characteristics. The schematic illustration of cell 310 in FIG. 9 is a conceptual approach which can be applied to the structures illustrated in FIGS. 1–8 and in the other structures disclosed in this application.

Referring to FIG. 9, cell 310 comprises anodes 314 and electrolytic members 316. Individual electricity generating subsystems are completed by cathodes 318. Hydrogen supply to the system is provided by a source 302 which is coupled to the cell 310 by a manifold 304.

Manifold 304 couples into upper and lower cell assemblies 310a and 310b. Manifold 304 is also coupled to a perforated tube 317 which has numerous holes 319 disposed therein and through which hydrogen from source 302 is evenly distributed throughout the entire system.

In accordance with the embodiment of FIG. 9, air handling is yet further enhanced by a plurality of barrier members 350 and 352 which prevent the escape of hydrogen directly through the anodes and cathodes, respectively. In similar fashion, a barrier members 50 and 52 could be provided in the other embodiments, as illustrated in phantom lines in FIG. 4.

Figure 10:
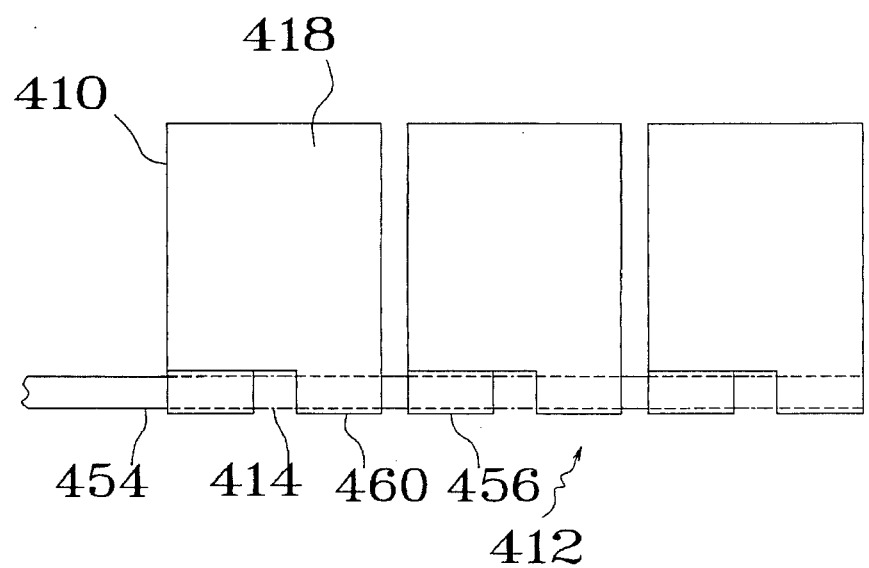
FIG. 10 is a schematic view of yet another alternative embodiment.

FIG. 10 schematically illustrates an alternative construction technique using sheets of graphite fiber paper to form the electrodes and in which system operation is enhanced through the use of increased effective ohmic contact area between individual electricity generating units in the cell. Here each individual unit cell 410 in the battery 412 includes an anode 414 and the cathode 418, separated by an electrolytic member 416 (FIG. 11). This particular arrangement has the advantage of relatively large low resistance contact areas, as compared to the relatively small contact areas between anode and cathode in, for example, the embodiment of FIG. 4. As illustrated in FIG. 11, connections between adjacent cells 410 in battery 412 is achieved using foil sheet connector conductors 454. Naturally, any suitable conductive member of suitable form, such as metal foil, metal wire, carbon fiber, graphite sheet, or the like may be employed as a connector conductor. Anodes 414 and cathodes 418 may be made of any suitable material, such as carbon fiber or graphite fiber cloth and electrolytic member 416 may be made of Nafion brand plastic electrolytic material (made by E. I. Dupont) or any other suitable product. As can be seen in FIG. 11, the connection interface between conductors 454 and anode and cathode extension tabs 456 and 458 represent substantially larger areas which, in principle, can be extended to be slightly less than half the length of the individual cells 410.

Referring to FIG. 12, the construction of battery 410 may be understood. In particular, it is noted that connectors 454, as illustrated in exploded perspective, are positioned between tabs 456 and 458. This is done during a stacking type assembly operation. In accordance with the preferred method of manufacturing the structure illustrated in FIG. 10, a continuous foil strip would be used during the stacking operation with portions 460 (illustrated in phantom lines in FIG. 10) being removed from the assembled structure in a die-cutting operation after assembly of the electrode, leaving behind the connectors 454 illustrated in solid lines in FIG. 10. A hydrogen feed is provided by a flat tube 417 which includes a plurality of holes 419 which are positioned to feed individual cells. Alternatively, many small holes may be substituted for large holes 419 and the interior of the tube provided with nubs 421 or other structures to prevent it from collapsing or becoming blocked.

It is also possible to obtain better sealing with and between electrode and electrolytic members by the use of plastic sheet gaskets 490 with windows 492 cut therein to allow the passage of gas. The same would be secured by heat sealing. It is also contemplated that a range of structures can be used to support an assembly in a spiral configuration, such as a film development type spiral support.

The following disclosure is added December 1992

In the embodiment of FIG. 13, a fuel cell according to the invention, which is particularly suitable for operation with a source of hydrogen, is shown in an upright or vertical position and takes the general form of a closed tube the interior of which is supplied with a gaseous fuel, preferably hydrogen, while the exterior is flushed with, or exposed to oxygen or an oxygenated gas such as air. This structure is designed to resist swelling of the electrolytic member which, in other configurations, creates curvature of the electrolytic member exerting pressure on the anode and cathode which may rupture the cell disrupting contact with the electrolytic member and reducing cell efficiency.

The side wall of the tube is constituted by laminar cell elements, namely a hydrogen-porous anodic electrode, or anode, an electrolytic member and an oxygen-porous cathodic electrode, or cathode, reading sequentially from the inside outward. Inactive end caps close the tube and carry connectors for the electrodes. At least one of the end caps has a connection for supplying hydrogen, although it would not be impossible to admit hydrogen into the cell interior through the side wall, if desired.

Some surprising and useful advantages are obtained from a mildly tapered tubular shape giving the side wall a frusto-conical shape. In particular, this configuration provides efficient and secure clamping of electrolytic member 516 between the electrodes 514 and 518, in a manner which is rendered self-tightening by any swelling of the electrolytic member 516. Furthermore, this novel fuel cell structure allows the cell to breathe freely with good exposure of the outer electrode surfaces to hydrogen and oxygen respectively. The design facilitates the admission of hydrogen to the interior of the cell and thence to the surface of the anode, in a gas-tight, leak-free manner, and avoids any need for complex gaskets that are subject to leakage.

The fuel cell structure shown in FIG. 13 is further designed for efficient oxygen, or air, flow over the outer surface of the cathode for removal of water and heat therefrom. The just-described advantages of this embodiment of my fuel cell invention, and their accomplishment, will be further explained in the following description.

Referring to FIG. 13, in which, with the obvious exceptions, horizontal cross-sections perpendicular to the plane of the paper are circular, the tubular fuel cell shown comprises an electrically active tube member 512 formed by a frusto-conical inner anodic electrode or anode 514 and a frusto-conical outer cathodic electrode or cathode 518, between which is supported a similarly shaped electrolytic member 516, the three elements being disposed concentrically.

While the corresponding frusto-conical shapes of the electrodes 514, 518 and the electrolytic member 518 could conceivably taper at an angle of 20° to the vertical, a preferred inward taper is quite small, less than 10°, and more preferably from 1° to 7°. In the best known embodiment of the invention, the electrodes 514, 518 and the electrolytic member 516 are not only of circular section, but also, as will be apparent from the foregoing description, concentrically arranged in the fuel cell.

Clearly, a circular section, while aesthetic and efficient, is a preferred embodiment of an annular member, which could have a quite irregular cross-section, but preferably has a regular cross-sectional shape such as triangular, square or polygonal. In this embodiment of the invention, circular is a preferred cross-sectional shape. A circular shape avoids seams, elbows, or other surface discontinuities in the tube member 512 and, as will be described in more detail hereinbelow, facilitates compression or clamping of the electrolytic member 516 between the electrodes 514, 518. To this end, the circular shape is effective in evenly distributing pressure on the electrolytic member 516 and in urging the electrodes 514, 516 into good electrical contact therewith over a wide area.

As may be seen in FIG. 13, the electrolytic member 516 protrudes beyond the anode 514 and the cathode 518, at the top and the bottom thereof, to prevent shorting out, to eliminate edge effects and to maximize the electrolytically active area.

As shown, each of the cell elements comprises a simple, continuous, integral member. A simple, frusto-conical tubular embodiment, as shown can also be constructed as a plurality of series-connected cell panels, extending circumferentially. However, more complex constructions providing a multicellular wall construction of the tube, such as is shown for the spiral or coiled embodiment of FIG. 8, are also possible. In this case, the individual cells, or panels, are connected in series around the side wall of the tube. Such a coiled construction requires separators or baffles to separate hydrogen from oxygen or air and to apply hydrogen only to one side of the resultant cell strip, the other side being exposed to air or other oxygen source. Preferably, where this construction produces a chamber for the oxygen-bearing gas, that chamber has an upwardly tapering section to assist in drawing heat and water vapor out of the cell, in a flue-like manner. Such passive convection process is favored by the upright disposition indicated.

Another embodiment employs a plurality of concentric tubular members 512, for example from two to ten members, with alternating anode-cathode dispositions in a radial direction, and suitable spacing between members. Such spacing can be maintained by inactive insulative supports, if necessary. The resultant array of nested sleeves is adapted to supply hydrogen to alternate spaces between anodes, in a non-leaking manner. This concentric structure is compact and useful where space is limited, and is lightweight and freely breathing. Multiple such structures can be designed to interfit, end-to-end, along an axis and be readily ventilated.

Also, part or parts of the tube member 512 could be of an inactive material, for example for support purposes, if desired. Thus vertical struts, or a lattice could be incorporated in the construction for strengthening purposes.

The tube member 512 is closed by an upper end cap 520 and a lower end cap 522, each of which is appropriately recessed, or otherwise adapted, as at 524 and 526 respectively, to accommodate and hold an end of the tube 512. Preferably, such recessing includes free space, or a clearance to accommodate vertical expansion of the electrolytic member 516 with use.

Lower end cap 522 is further equipped with an anode connector 528, a cathode connector 530 and a hydrogen connector 532. The end caps 520–22 can be plastic moldings and are structures to seal against hydrogen leakage so that the only pathway for hydrogen admitted through connector 532 to leave the cell, is through the anode 514. The connector 532 can be a simple male-configured screw-threaded molding as shown, but can clearly have other constructions, such as female, snap-connection and the like. It can be molded integrally with the end cap 530, or can be a separate, possibly lightweight alloy, element pressed or screwed into the end cap 530. The connector 532 should be robust and secure, capable of being tightened on to a cooperative supply connector sufficiently to prevent hydrogen leakage. A relatively wide-bore connection is preferred for free passage of hydrogen at a low pressure. Gaskets can be used for end sealing the tube 512 into the end caps 528–530, if necessary.

Both end caps 520–22 are plug-like and have substantial thickness in the vertical direction to provide substantially rigid, lightweight, but dimensionally stable, end supports for the tubular cell member 512. While both electrical connectors 528–530 are shown at the same end of the cell as the hydrogen connector 532, to facilitate service connections to assemblages or banks of cells, one or both connectors 528–530 can be provided at the upper end of the cell in the upper end cap 520, if desired.

Where a more complex spiral or multiple concentric tubular member structure 512 is employed, the end caps 520–522 can be adapted to provide closure and support, their purposes being to support the tubular electrolytic structure or structures 512 in a manner that also permits definition of a sealed hydrogen chamber or chambers in which anode or anodes 514 is or are fully exposed to hydrogen. Thus the end caps 520–522 can have spiral or multiple concentric recessing mating with the ends of the tubular member 512, and may be ducted or ported for the admission of hydrogen as required. The cell shown in FIG. 13 is a single cell with single opposed connectors 528–30, each of which is constituted by a right-angled conductive metal stamping such as brass which is embedded in the end cap 530 and adhered or pressed into contact with a respective surface of the anode 514 or cathode 518. A variety of alternative connector arrangements is possible in keeping with the spirit of the invention, according to mechanical convenience and the desired electrical output. For example, where the tubular fuel cell has a multi-cellular construction, as suggested by the embodiment described with reference to FIG. 8, a plurality of electrical connectors can be disposed around the end cap 530 or, more efficiently the cells can be internally connected, either in series or in parallel, depending upon whether voltage or current capacity is desired, to a common output connector such as 528 or 530.

The tubular-cell embodiment shown in FIG. 13 can employ any of the individual cell constructions and materials described elsewhere herein that can be conformed to a tubular shape. Each electrode 514 and 518, is preferably self-supporting and substantially rigid, and, as described hereinabove, can be formed of graphite or carbon fiber, supported, if necessary, on a suitable porous matrix material which can be polymeric or a paper. As described above, catalytic means are provided at the anode 514 and at the cathode 518 at or in the vicinity of the surfaces mating with the electrolytic member 516, to dissociate hydrogen and oxygen molecules respectively. Such catalytic means can, as described herein, be constituted for example by deposits of finely divided platinum-group metals, such for example as platinum black, with a water-rejecting matrix at the cathode, said deposits being made on the appropriate electrode surface.

Preferably each electrode 514, 518 has machined ends for a good mechanical fit within the end caps 528–530.

The electrolytic member 516 is a solid thin member, in other words a film, of thickness as indicated hereinabove, with a non-fluid, ion-exchange matrix constitution. As described above, it can be a proton-exchange membrane which selectively promotes transport of hydrogen or hydroxonium ions or other cations while resisting passage of anions. The electrolytic member 516 is quite thin, and is preferably relatively soft and flexible to conform closely with the electrode surfaces. Polymers offering a proliferation of covalently bonded strongly electronegative radicals such as a perfluorosulfonic plastic, as described herein, are suitable.

The electrolytic member 516 is pressed into gas-tight, sealing contact with the anode 514 and the cathode 518, in a manner that preferably maintains contact over an extended area in a substantially continuous manner. Maintaining adequate contact between the electrodes and electrolytic members is a problem with prior art hydrogen fuel cells, because of a tendency for the electrolytic member to swell as water is formed. Prior art designs can resort to rather heavy, unwieldy means for applying adequate pressure to contain such swelling. The aspect of the invention embodied in FIG. 13 provides a simple, elegant solution to this problem.

This embodiment is uniquely adapted to overcome potential problems, such as swelling, that may be brought about by the generation of water in the cell especially at the cathodic surface of, or in, the electrolytic member 516. By constraining the electrolytic member on a rigid mandrel constituted by the inner anode 514, with a sleeve constituted by the outer cathode 518, swelling is controlled and resultant distortion of the electrodes can be prevented. Such swelling and distortion can, if not controlled, cause areas of loss of contact between the surfaces of the electrodes 514, 518 and the electrolytic member 516 resulting in loss of efficiency of the cell and, possibly, hydrogen leakage.

This desirable tight sandwiching of the electrolytic member is enhanced by the slight inward taper which the electrodes 514, 518 have in an upward direction. This enables them to be snugly interfitted, compressing the electrolytic member 516 between them, in a simple and effective manner which subjects it to great pressure. Also, potential lateral expansion of the electrolytic member is translated into lengthwise displacement. By placing the tubular electrolytic member 516 between the concentrically mounted tubes constituted by the electrodes 514, 518, the electrolytic member 516 can expand longitudinally as water is synthesized within it but, in an adequately constructed embodiment, cannot force the electrodes 514, 518 apart to break contact with the electrolytic member 516. To the contrary, expansion of the electrolytic member 516, owing to water synthesis, is now harnessed to the ends of cell efficiency, causing great pressure to be exerted between the electrolytic member 516 and each electrode 514, 518, ensuring good wide area contact therebetween.

The frusto-conical geometry provides excellent mechanical advantage enabling great lateral or radial pressure to be applied between electrodes 514, 518 by means exerting relatively modest lengthwise forces on the electrodes. The requisite lengthwise pressure can be built in on assembly of the fuel cell, or could be applied externally by clamping or housing means, while clearance in the end caps 528–530 accommodates lengthwise expansion. Simple friction from a tight push fit can be adequate to maintain the requisite pressure. The overall frusto-conical shape when extended to end cap recesses 524, 526 assists such fit, and a press-fit design can be achieved in various mechanical ways, for example, by providing additional lengthwise clearances to receive an electrode 514 or 518, one such clearance being provided in each end cap 528–30 so that the electrodes 514 and 518 have room for limited relative lengthwise movement.

One assembly method which can readily pressurize the members lengthwise employs a first slightly conical graphitic tube as inner electrode 514, over which a thin flexible tube of a plastic electrolytic member of a suitable material, for example NAFION (trademark DuPont) is drawn so as to fit snugly. A second slightly conical graphitic tube, slightly wider than the first, is then drawn down tightly and snugly over the electrolytic member on the first graphitic tube. Platinum black catalyst material is applied to the electrodes or electrolytic member, as described above. The end caps 528–30, with gaskets if used, are pressed on to this assembly or, in a modified embodiment, screwed on, and the hydrogen connector 532, if not present on the lower end cap 532, is attached. In use the assembled fuel cell can be screwed into a manifold pipe for the supply of hydrogen. This assembly method provides an economical and easy manufacturing process and a simple, reliable product.

Since electrical output is related to the surface area of the electrode-electrolyte interface, the output per unit volume is inversely dependent upon the radius of the electrode tube. Thus, optimal dimensioning will depend upon considerations of attainable curvature of the electrode elements and adequate hydrogen supply into a small bore electrode tube, the latter being somewhat length-dependent. Hydrogen connectors could of course be supplied to both end caps 528–30, but to do so would add complication and expense. The effective length of the cell will be limited by the structural strength of the electrodes 514 and 518, noting that their thickness is limited not only by weight considerations, but also by the need to admit hydrogen and oxygen to the electrolytic member 516. At this time a length of about 15 cm. and a gross diameter of about 5 cm. are suitable dimensions for a preferred embodiment. Inert cage or porous skin members could reinforce the electrodes 514, 518 but again, would complicate and add to the expense of a product that must be simple, reliable and inexpensive if it is to be competitive.

The inventive embodiment as shown in FIG. 13, what may be termed a tubular fuel cell, has the additional merits of facilitating the supply of both hydrogen and oxygen to the electrode assembly 514–518 and also of facilitating the removal of water vapor. The open interior of the cell ensures efficient distribution of hydrogen over the full available surface area of the anode 514, while the upright disposition and convex outer cathode surface promote convective ventilation. The exposed exterior surface of the cathode 518 can readily be simply exposed to ambient air, or housed or shrouded, and subjected to forced air or oxygen flow which will both provide cathodic oxygen and remove water vapor.

If desired, vertical spacers can be provided to position the end caps 528–530 vertically in relation to the electrodes 514, 518, and to maintain a desired initial or working pressure on the electrolytic member 516. Such spacers could be provided with resiliently yieldable means to maintain a desired pressure range on the electrolytic member 516. Alternatively, the end caps 528–530 could be mounted to similar effect, for which purpose they may be attached to the electrodes 514, 518 in a manner providing for limited relative lengthwise movement between the electrodes 514, 518. Such working pressure can thus be somewhat relieved to prevent mechanical rupture, but should be maintained at a substantial level, to maintain good contact. In general however, the objectives obtained by this embodiment of the invention are to maximize the pressure on the electrolytic member 516, within the limits of mechanical integrity.

As will be clear from the foregoing description, in use, an inventive cell such as is shown in FIG. 13, is supplied with low pressure hydrogen gas through connector 532, to fill the volume within the tube provided by electrodes 514 and 518, while the outer surface of cathode 518 is exposed to air, and preferably to a forced flow of air that will remove water vapor product. As explained above, catalytic action liberates active hydrogen species at the anode which migrate into the electrolytic member to meet and combine with active oxygen species catalytically liberated at the cathode, building a potential difference that can drive an external flow of electrons in the opposite direction. Electricity is tapped from connectors 528–30.

In addition to ease of manufacture, the tubular fuel cell embodiment described here and shown in FIG. 13, provides a simple, reliable and effective solution to many problems of hydrogen fuel cells, providing new ways to overcome swelling of the electrolytic member, of supplying hydrogen and oxygen and of removing water vapor. It is also suitable for assembling into batteries or banks to provide aggregated electric power output.

Figure 14:
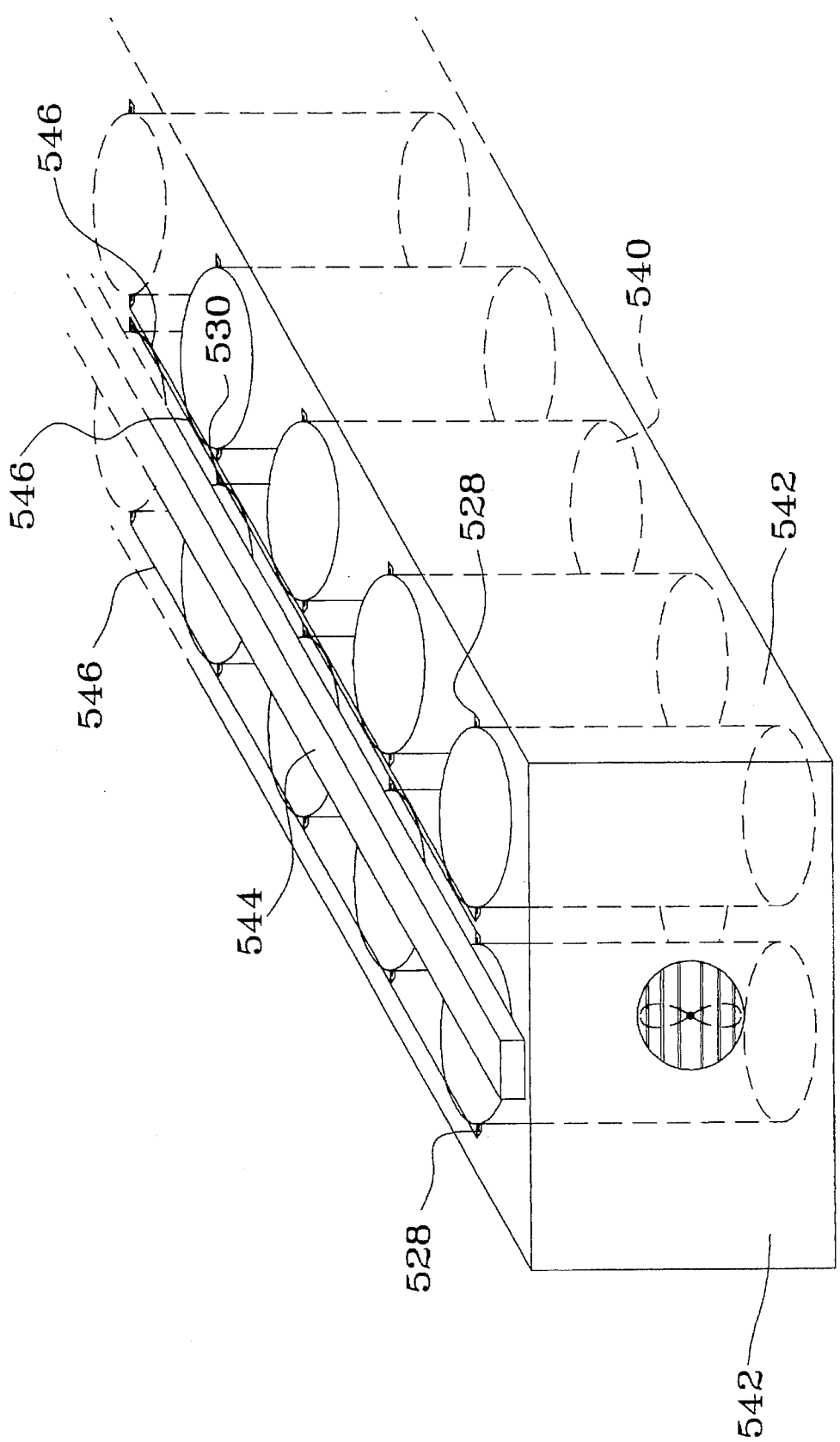

FIG. 14 is a simplified schematic view of an array or battery structure illustrating some of the ways the inventive tubular fuel cells described with reference to FIG. 13 can be assembled together. In FIG. 14 two rows of such tubular fuel cells 540 are mounted in a box-like housing 542. Overlying one row is a hydrogen manifold 544 to which each cell 540 in that row is connected. A similar manifold, not shown, is provided for the second row of cells 540 and could interconnect with the first. Busbars 546, not all of which are shown, run between rows of connectors 528– 30. With the connectors 528–30 symmetrically disposed on the cells 540, the orientation of adjacent cells will determine whether they are connected in series for voltage or in parallel for current. This flexibility permits an array readily to be adapted for diverse applications. The busbar electric pickup is clearly very simple and can be readily adapted to many other configurations and is suitable for extension to large and very large arrays with mixed series-parallel connections for balanced power output. Many other electrical connection possibilities will be apparent to those skilled in the art.

At the near end of the housing 542 is a fan 548 to move air within the housing for provision of oxygen and removal of water vapor. The fan 542 can, if desired, be powered from one or more cells 540. On a vehicle in motion adequate air flow could be provided by scoops and ducted to the housing 542, with the fan 542 being operative primarily when the vehicle is stationary. In a vertically disposed embodiment air flow can be provide by or assisted by convection as the cells generate heat.

As suggested by FIG. 14, tubular cells 540 with a circular section are suitable for hexagonal close-packing, providing volume optimization. Adequate clearances are left for structural purposes and to provide adequate airflow. Such hexagonal disposition also assists air distribution by minimizing by-pass routes.

Clearly there is no particular limit to the number of cells 540 in an array, and there may be tens or even hundreds in a row. Equally, there can be many more than two rows and other housing structures will be apparent.

The enclosure provided by the housing 542 provides the possibility of using substantially pure oxygen or oxygen-enriched air rather than air, either for better cathode efficacy or to prevent formation of undesired ammoniated by-products at the cathode 518, from dissociated, activated nitrogen.

If the possibility of hydrogen leaks represents a perceived hazard, the manifold 544, and other hydrogen-containing components, including tanks, can be shrouded to enclose them and separate them from any of the connectors. Such shrouding could be purged of small amounts of hydrogen by constant throughput of air, possibly again, scooped from the slipstream of a vehicle. It is to be noted that the danger from hydrogen relates to accumulations, especially around electrical components that may generate sparks, especially when serviced. Small amounts of hydrogen, adequately diluted with air, present little risk. Such hydrogen-equipment shrouding could harbor a suitable location, such as an exhaust therefrom for a hydrogen-sensitive leakage indicator.

Another aspect of the invention relates to solving the problem of providing, in a simple and economical manner, a permanent bond between the electrodes and the electrolytic member of a fuel cell which provides good electrical contact therebetween over an extended surface area. In this aspect the invention also solves the problem of incorporating catalytic material in a fuel cell in a desired location within the cell in a controlled manner.

Adlhart U.S. Pat. No. 4,175,165 discloses bonding the catalytic electrodes of a fuel cell to an ion exchange membrane by pressing the membrane between the electrodes, catalyst side towards the membrane, with the application of heat. The suggested temperature is from 200° F. to 400° F. and the preferred pressure is about 800 psi. These are aggressive conditions.

The present invention is able to achieve an improved bond between an electrode and a polymeric electrolyte in a manner employing mild process conditions. Thus, the invention provides a novel fuel cell comprising a solid or film-like polymeric proton-exchange electrolytic membrane sandwiched between layered catalytic electrodes which further comprises an adhesive system or sealant bonding said electrolytic membrane to at least one of said electrodes, said sealant being the cured product of a liquid-phase electrolytic polymer. In this aspect, the invention solves the problem of maintaining good contact between the electrolytic membrane and the electrodes under a variety of conditions.

Use of a liquid-phase electrolytic polymer enables voids to be filled and provides a conductive bridge between the two solid-phase members. Furthermore, it provides a means of introducing a catalyst material at a desired location in a controlled manner. Thus a suitable catalyst, or catalyst system, such as a finely divided platinum group metal, for example platinum black, can be incorporated in the liquid-phase polymer composition and deposited therewith to form a novel catalytic layer which is located, in a general sense between an electrode and the electrolytic member, (although some of the liquid phase will probably permeate into the porous electrode) and which bonds its neighboring layers together in a manner providing continuous electrical contact over an extended area. As described above, at the cathode a hydrophobic material such as polytetrafluoroethylene can be included in the catalyst system, which is here furnished in the liquid-phase sealant, to throw off electrolytically synthesized water.

Preferably the liquid-phase sealant is applied to one mating surface either on an electrode or the electrolytic member, with the electrode or electrolytic member in the solid state, the other member is applied to the resultant adhesive-coated surface while the adhesive is still wet, and pressure is applied to eliminate voids before or during curing of the sealant, which can be effected with heat, if appropriate. Preferably, both electrodes are bonded to the electrolytic member by means of a conductive sealant as described herein.

The conductive adhesive bonding between electrolytic member and electrode afforded in this aspect of the invention also provides mechanical strengthening of the inventive fuel cell and may add various degrees of rigidity. With this in mind, the bonding should be controlled according to the desired shape or flexibility of the cell. Thus for spiral, or frusto-conical or other more complex shapes, the electrodes, electrolytic member and any substrate, if used, can be preformed to shape and then assembled with the described sealant. Alternatively, the complete assembly from electrode to electrode, with adhesive, and optionally with a substrate, can be assembled and then shaped prior to curing of the sealant. If desired, a strengthening polymer, preferably a conductive or hydrogen-transporting polymer, can be incorporated in the sealant, for example an epoxy resin. However, any such strengthening polymer should not comprise hydrogen ion transport across the electrode-electrolyte interface.

Clearly, the sealant should be capable of transporting protons and accordingly, a proton-exchange polymer is suitable such, for example as a perfluorosulfonic acid polymer, as described above for the electrolytic member, preferably NAFION. Thus the adhesive can be, and preferably, for bond integrity and electrolytic continuity is, the same material as the electrolytic member, with the addition of a catalyst. An equivalent results could be obtained, with suitable process control, by depositing the electrolytic member, partially curing same, applying catalyst particles to a wet surface of the deposited electrolytic member, further partially curing the polymeric electrolytic member, applying an electrode to the still-wet catalyst-treated electrolytic member surface, preferably with pressure, and completing the curing.

The liquid-phase sealant can be applied in a silk-screen process which enables the adhesive to be applied to an electrode or electrolytic member surface in a well-defined pattern to match, overlie or otherwise relate to the shape or pattern of the various cell elements, especially, for example, for the lapped multi-cell configurations of fuel cell described hereinabove with reference to FIGS. 1–12. Preferably, the adhesive layer extends to and around the edges of the electrodes, to coat them and reduce edge effects, preferably with a fillet.

The polymeric material used for the electrolytic member, or for the sealant, or for both, is preferably selected from the group consisting of perfluorosulfonic acid polymers, homologs, analogs and copolymers thereof, and as stated above is preferably NAFION.

Figure 15:
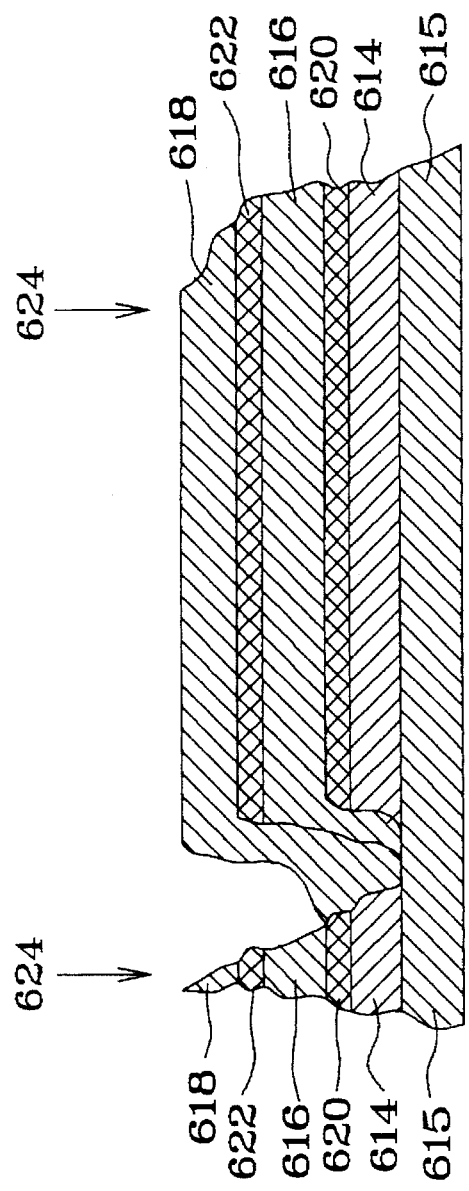

In the partial sectional view of FIG. 15 an inventive fuel cell embodying adhesive electrode-bonding comprises thin-layer or laminar electrodes, namely an anodic electrode or anode 614 and a cathodic electrode or cathode 618, bonded to either side of an electrolytic member 616, by adhesive layers 620 and 622 respectively. The anode 614 is supported on an oxygen-porous substrate 615. Boundaries that can be defined by silk-screen resists are indicated by arrows 624. The structure is similar to that shown in FIG. 4, with the cathode 618 cascading down to contact a trailing anode 614 and provide a series connection thereto. The only conductive path from cathode 618 to its underlying anode is through an adequate thickness of electrolytic member 616. It is insulated from a trailing cathode by insulative fill. FIG. 15 is a schematic representation of a fuel cell manufactured by depositing a plurality of elements from liquid phase. Successive layers are slightly set back from their respective support layers. However, the adhesive layers 620, 622 could be extended downwardly, more completely to cover the next underlying layer, if desired.

Figure 16:
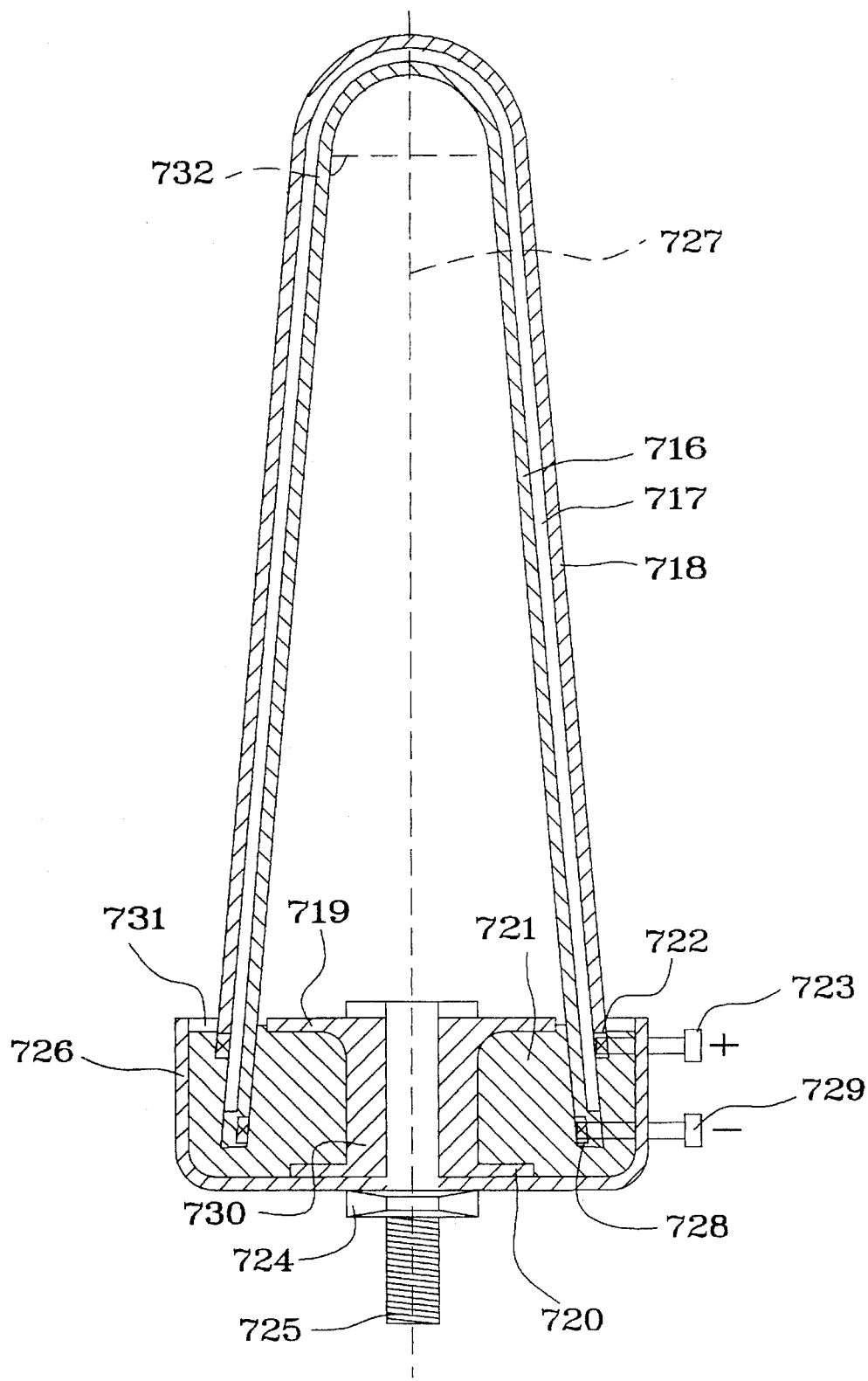

The embodiment of fuel cell shown in FIG. 16 bears substantial similarities to the tubular structure of the FIG. 13 embodiment. This embodiment is a sealable self-tightening fuel cell which has few components, can be readily assembled and can be sealed against hydrogen leakage in a one-step process.

Significant differences from the tubular or tapered cylinder fuel cell shown in FIG. 13, are that there is no upper end cap such as 520 and the conical cell disclosed here has a lower end cap in which all joints susceptible hydrogen leakage are located and which can be flooded with sealant to prevent such leakage. To this end, the cell has a layered electrode assembly formed into a rounded-tip conical shape much like a traffic cone.

Referring to FIG. 16, the substantially conical fuel cell shown comprises in a preformed layered structure an anodic electrode 716, a cathodic electrode 718 and an electrolytic member 717 sandwiched therebetween. The tapered and curved shapes of these members also provide for strains generated by swelling of the electrolytic member 717 to be translated into clamping forces promoting contact between the electrodes 716, 718 and the electrolytic member 717. These three members are carefully manufactured one-piece elements which provide an integral coherent structure free of pinholes or other sources of hydrogen leaks. Hydrogen can only traverse this electrode structure by permeating through it whereupon electrocatalytic activity oxidizes the flammable gas to innocuous water.

The substantially conical electrode structure is closed in a hydrogen-tight manner by a lower end cap comprising a dish like base 726, and a disk-like base plate 719 which cooperate to provide a sealant compartment in which the circular ends of the electrolytic elements 716–718 are received. For the admission of hydrogen to the cell, base plate 719 has a central hollow stem 730 with a threaded extension providing a hydrogen connector 725 passing through a central opening in base 726, where it is secured to base 726 by an external holding nut 725. A ring gasket 720 provides a coarse seal between the stem 730 and the base 726.

An optional closing ring 731 can be provided outside the electrode structure 716–718 to retain the electrode assembly. If desired, lugs or threads can be provided for closing ring 731 to snap or otherwise lock into place around the top of base 726. The ends of the cathodic electrode 718 and the anodic electrode 716 are press-fitted with a cathode connector ring 722 and an anode connector ring 728 respectively and the electrodes 716–718 are preferably plated where they engage the connector rings 722, 728, to insure a good electrical connection to the connector rings, for example with copper, silver, gold or platinum or the like.

The base components 719, 716 can be formed of any suitable material, for example stainless steel or a strong, substantially rigid and dimensionally stable plastic for example LEXAN, General Electric Company. In a preferred embodiment they are plastic moldings formed integrally with the hydrogen connector 725. If the electrode structure has a straight configuration within the base, paralleling the axis 727, closing ring 731 can be formed integrally with base 726, for example as a molded lip.

Take-off terminals, 723 positive, and 729 negative, provide external connections to the connector rings 722, 728 and thence to the electrodes 716, 718 and are accommodated in a suitable opening or openings in the base 726. Except for these terminals and openings, the fuel cell is substantially symmetrical about a central axis 727, the parts shown having mostly circular cross-sections in horizontal planes perpendicular to the plane of the paper.

The annular sealant compartment defined between base 726 and base plate 719 is charged with a suitable sealant which is preferably somewhat adhesive. The sealant is of course insulative and is preferably also initially plastic and flowable, to provide good fill of crevices and is preferably curable to a hard or moderately resilient mass so as to seal possible hydrogen leakage areas between for example the electrodes 716, 718 and their mechanical supports constituted by the base members 719, 726; between the electrodes 716, 718 and the electrolytic member 717; and between the base 726 and the hydrogen connector 725, the closing ring 731 and the base plate 719; and to seal any terminal opening in the base 726. Upon curing the sealant also imparts structural stability and rigidity, to the fuel cell and, if the sealant is a resilient material, provides cushioning against shocks, for example accidental blows on the outer electrode 718 incurred during installation or maintenance.

To ensure elimination of voids, the sealant can be applied under pressure with excesses that emerge being stripped off. Many sealants are suitable to meet the foregoing criteria, for example injection moldable materials such as rubbers or silicone rubbers.

By forming the electrode elements as one-piece structures with a closed end and a single open end, potential hydrogen leaks can be isolated to a single compact region at the mouth of the electrode structure where such potential leaks can be contained, sealed and eliminated. This inventive structure and process of manufacture effectively overcomes difficulties in sealing fuel cells which are well known to the art.

The blunted-cone shape is a preferred embodiment of such a structure in which the electrodes are continuous and smoothly curved to reduce stresses or weaknesses and are reasonably compact to provide a good surface area to volume ratio with an assemblable, nestable shape.

To promote intimate contact between the electrodes 716, 718 and the electrolytic member 717, mechanical means to urge them into tight engagement can be provided. For example, electrodes 716, 718 can be mutually stressed during assembly, in opposing axial directions, by providing a support abutment in the base 726 beneath the end of inner anodic electrode 716 and pressing closing ring 731 downwardly on outer electrode 718.

However, it is preferred that, prior to use, the electrodes 716 and 718 are snugly nested together, with the electrolytic member 717 sandwiched between them, the assembly resembling a small stack of nested paper cups. Application of sealant anchors the electrodes in place and operation of the cell wets the electrolyte 717, causing it to swell. The tapered shape harnesses this swelling to press each electrode 716, 718 into intimate electrical contact with the electrolytic member 717.

To accommodate manufacturing tolerances or lengthwise adjustments between the electrodes 716, 718, the inner anodic electrode 716 can be decapitated for example where shown by the broken line 732.

Any of the electrode or electrolytic materials and structures described herein that are suitable for configuration as described with reference to FIG. 16 can be used for this embodiment, especially those described a suitable for the embodiment of FIG. 13. Preferably, the electrodes 716, 718 are bonded to the electrolytic member 717 by a proton-exchange adhesive such as is described herein with reference to the embodiment of FIG. 15.

A preferred material for the electrodes 716, 718 and also for the electrodes 514,518 of the FIG. 13 embodiment is a porous, rigid, graphite, or carbon fiber. Such a member can be manufactured from graphite paper or cloth or from a carbonized polymeric organic cloth. The cloth can be, for example a woven polyester fabric, which is preformed to shape. The resultant sock or tube is then heat-treated by baking or firing it in an inert atmosphere to decompose the polymer, drive off volatiles and yield a conductive graphitic skeleton which has significant structural strength and is self-supporting. Such products are supplied by Fiber Materials, Inc. Biddeford, Me.

Appropriate thicknesses of electrode 716, 718 lie in the range of about one-sixteenth to one quarter of an inch and are preferably about one eight to three sixteenths of an inch for a cell structure of the order of a foot or less in length and several inches, for example three or four, in diameter.

The fuel cell embodiment described with reference to FIG. 16 is not only a safe and efficient electricity generator, but is also designed for economical mass production. An electrode sub-assembly and a base or end cap sub-assembly can be prepared with little input of labor. Final assembly comprises the capping of the electrode sub-assembly with the base sub-assembly, followed by a brief sealant injection operation which closes hydrogen leaks and bonds the sub-assemblies together.

The electrode structure provides an enclosed chamber for hydrogen admitted through the base assembly, which base assembly serves to close off the electrode structure. All edges of the electrode structure are received into the base sealant compartment where they may be effectively sealed against hydrogen leakage.

Because individual cell output provides relatively low voltage at a substantial amperage, it is important to take steps to preserve the relatively modest potential differences generated and avoid any voltage losses, for example through contact resistance. To this end, as described above, plating, and contact rings may be employed.

Figure 18:
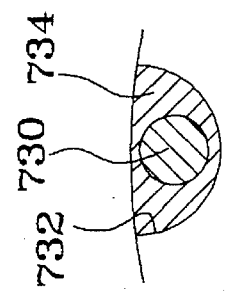
Figure 17:
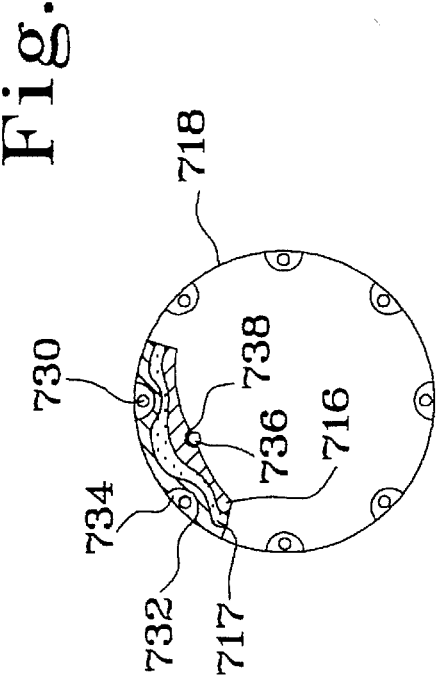

Another strategy is to provide additional current-collecting structures that pick up current from locations distributed across the external surfaces of the electrodes. One possible arrangement for achieving this end is shown in FIGS. 17 and 18 which schematically depict structures which can decrease the distance traveled in the electrode by the carrying currents, facilitate current collection and prevent losses.

As shown, conductor wires 730 are channeled in lengthwise troughs 730. FIG. 17, which is quite schematic shows an outline of a section through a cone-like fuel with eight such conductors 730 distributed uniformly around its perimeter in troughs 732. As the small segment of cross-section which is illustrated in FIG. 17 shows, anodic conductor wires can be similarly distributed in longitudinal troughs 738 in the surface of the anodic electrode 716. Preferably, conductor wires 730 and 736 are circumferentially staggered so as to stagger the troughs and bulges in the electrolytic structure. To protect conductor wires 730 and 736 from exposure to hydrogen, plastic filler 734 can be used, as shown in FIG. 18, and this can be a conductive filler. Filler 734, depending upon choice of material, can provide stiffening which stiffening can be augmented by an appropriate gauge of conductor wire 730 and 736. If desired, transversely or circumferentially disposed conductor wires (not shown), intersecting the upright wires 730, 736, can be similarly provided to create a frame, which can add substantial support. Such frames can be used to press and hold the electrodes 716 and 718 in tight engagement with electrolytic member 717. The wires of such a current-collecting framework should, at least on the cathode side of the cell, be completely protected from exposure to hydrogen to avoid contaminating the hydrogen with metallic hydride, for example, by coating or embedding the wires 730, 736 with plastic as shown. The end terminations of any conductor wires, such as 730 and 736, may be soldered or welded to connector rings 722 and 728, and, in order to avoid hydrogen exposure, are preferably buried in sealant 721.

The arrangement of longitudinal conductor wires 730 and 736 described with reference to FIG. 17 reduces the maximum distance any current need travel, in its respective electrode, from about the full length of the electrode to about half the maximum circumferential spacing between conductors 730 or 736.

The invention disclosed herein extends to novel manufacturing processes including the direct formation of an electrolytic member on a surface of a shaped self-supporting carbon-fiber electrode, especially on the convexly curved outer surface of an anode.

The electrolytic member 717 can be prepared by molding a suitable proton-permeable polymer or membrane, such for example as the perfluorosulfonic polymer described herein, to fit closely over the anodic electrode 716, employing pressure or vacuum with or without heat.

However, a preferred manufacturing process for the electrode assembly comprises coating a shaped anode with a liquid, curable proton-transport polymer, or proton-exchange membrane material, notably the perfluorosulfonic polymer repeatedly recited herein, by dip-coating or spraying a form, or the anode itself, into or with the polymer at about room temperature, and then curing it, for example, by heat drying. A concentration in the range of about 1 to 25%, for example from 3 to 10%, by weight of the proton-transport polymer can be used as a coating or spraying solution, with a concentration of about 5% being preferred. A suitable such proton-exchange polymer solution is a 5% solution of a perfluorosulfonic acid resin in a hydroalcoholic solvent system comprising for example, isopropanol and water.

The coating step is repeated one or a number of times to the required thickness of electrolytic polymer, with a curing step between coating cycles. Each such coating step may include one or more coatings with a curable liquid electrolyte containing a suitable catalyst such as finely divided platinum.

Preferably, the curing step is a two-stage process. In a first stage solvent is driven off at a moderately elevated temperature in the range of about 40°–80° C., for example, for five to ten minutes or less at about 60° C. A second, higher temperature curing or drying stage is important to bake out impurities or potential membrane contaminants that may impede the membrane's proton-transport performance. This second stage should attain a temperature in the range of about 110°–150° C. for at least a minute, while 5 to 10 minutes at about 120° C., is satisfactory. Other suitable purification techniques will be apparent to one skilled in the art, especially for the destruction of biologicals, including irradiation, microwave baking, and the like.

Upon completion of the electrode-coating process, the coated anodic electrode can be pressed together with a mating cathodic electrode into a single component to which the connector rings 722, 728 with terminals 723, 728, are fitted to complete the electrode sub-assembly.

As described above, this sub-assembly is joined with the base assembly and sealed to complete the fuel cell. If desired, mounting extensions can be provided on the base 726.

It will be appreciated that the various configurations adaptations and dispositions of the cell elements, the materials employed and the process steps that have been outlined are generally suited to, or particularly dispose the invention for, realization by mass production. Modifications of these features that better suit the invention to mass production or improve its production features, will be apparent to those skilled in the art.

Any of the electrode assemblies described herein can employ blow-molding or vacuum molding of a proton-exchange polymer to produce a polymeric electrolyte film or a shaped member supported on a form. This technique is particularly applicable to the lapped multicellular constructions described with reference to FIGS. 1–12 and 15. These constructions preferably employ a very thin electrolytic member, with a thickness of for, example from 0.001 to 0.020 cm., which is to say, from about 10 to 200 microns. Such a film or member can be rendered catalytically active by coating one, or preferably both, surfaces with a slurry of catalyst particles preferably intermixed with conductive carbon particles, in view of the importance of enhancing conductivity and reducing resistance in every feature of the cell's electrical construction. A suitable commercially available product comprises about 20% by weight platinum codeposited on a conductive carbon such as sold under the trademark "VULCAN" by Johnson-Matthey Inc., Malvern Pa. As described above, the catalyst is preferably finely divided platinum, and the slurry can comprise a conductive proton-exchange polymer, preferably a perfluorosulfonic acid polymer. The electrodes for such cells are preferably some what thicker than the electrolyte membrane, about 0.01 to 0.05 cm.

Noting that substantial quantities of water are synthesized at the cathode, it is desirable to enhance water-removal therefrom without impairing its conductivity. This can be achieved by coating a graphitic or porous carbon or carbon fiber cathode, with a dilute suspension, for example 5% by weight solids, of polytetrafluoroethylene particles (for example "TEFLON", trademark DuPont Company) and sintering it to provide a fused coating which encourages the cathode to shed water. The cathode remains conductive but allows water to pass easily through it, so that synthesized water can be easily removed or evaporated, or will drain.

It is believed clear from the foregoing description, that an important objective which is achieved in the practice of the present invention is to ensure intimate contact between the electrodes and the electrolytic member between them. This contact should preferably involve positive pressure applied by any of the various means disclosed herein, and that pressure should extend over the whole contact area in a reasonably uniform manner, if possible. It is of particular importance to ensure that such widespread intimate contact between electrode and electrolytic member or proton-exchange membrane be maintained during and after extended use of the cell. Normal use of the cell generates water, which will swell the membrane, to an extent of 15–17% in a NAFION (trademark) polymeric electrolytic membrane, creating great separation pressures on the adjoining electrodes. These forces tend to rupture the cell and are effectively contained or even harnessed by means of the invention described herein. In a relatively sophisticated construction designed to relieve these membrane-swelling forces in a lateral direction, thereby to maintain and promote intimate contact with the electrodes, the wound, lapped multicellular arrangement described with reference to FIG. 8, can be rolled around or mounted on a slightly tapered tube or tubular support, and covered and clamped in place by a second slightly tapered tubular cover or sleeve, after the manner of the mechanics of the construction described with reference to FIG. 13.

The preferred embodiments of inventive fuel cell described and shown herein provide several constructions in which a hydrogen chamber overlies the cell's exposed anode surface so that hydrogen can be introduced into the chamber and, under pressure, will be caused to flow through the anode to the electrolyte film where it is catalytically stripped of electrons. The resultant protons or hydroxonium ions are transported through the film and to the cathode, where they meet and combine with similarly ionized oxygen atoms, to form water and generate an electric potential difference across the cell. While some embodiments show an enclosed cell construction with the anode and hydrogen chamber contained within the cell, and a cathode supplied with oxygen disposed on the outside of the cell, this disposition could be reversed, placing the cathode on the inside and shrouding an external anode surface with a hydrogen chamber. Also, an external cathode can be shrouded for the supply of oxygen and the removal of water.

Hydrogen must be supplied in a contained, pressurized manner involving chambering or ducting, albeit usually at a low or modest pressure of a few pounds psig. Very little pressure is needed to maintain a hydrogen atmosphere at the anode. In practice, if hydrogen is generated in situ, from a metal hydride, for example from a portable canister, (the use of which coupled to one or more of the fuel cells disclosed herein constitutes a further embodiment of the present invention,), then, depending upon what flow regulation means are also coupled in circuit between the hydrogen generator and the fuel cell, the hydrogen pressure at the anode may be substantially that of the generator. This pressure is subject to substantial fluctuations between, for example 30 psig or more, and a tenth of a pound or less. Preferred embodiments of fuel cells according to this invention are able to operate satisfactorily with such pressure variations. Hydrogen requires special measures to prevent leakage, some of which have been described here, because of its high permeation rates through many materials, and its flammability. Typical specifications call for molded plastic seals for hydrogen, with a thickness of at least one eighth of an inch (3 mm.). Furthermore, contamination of the electrolytic structure with metal hydrides carried in on the hydrogen stream, should also be avoided, as they interfere with proton transport. Accordingly, the hydrogen supply should avoid such contamination, and may, if desired pass through a water or acid trap, or some other filter system, to remove such hydrides. Additionally, or alternatively, hydrogen-contacting structures should be plastic or high grade stainless steel, although of course, contact with noble metals is permissible.

While oxygen can be delivered to the cathode simply as a forced, or even convective, air stream, it is preferred that pressurized oxygen be supplied in a contained, ducted manner to the external surface of the cathode.

While the invention has been described with reference to a hydrogen fuel cell, other flammable gases besides hydrogen can be contemplated as being usable in the practice of the invention, for example, methane, ethane, propane or acetylene, natural gas, producer gas and vaporized gasoline, methanol or ethanol. However, such gases or vapors do not have hydrogen's advantages of lightness and having a single, harmless combustion product, water. Moreover, other gases will have larger molecules than hydrogen has and may generate ions that do not satisfactorily migrate to the electrolyte, may not be satisfactorily catalytically activated, as necessary and can have other drawbacks not displayed by hydrogen. Also, hydrogen is more polar than carbonaceous flammable gases and therefore more ionizable. Thus, hydrogen is the strongly preferred fuel for the fuel cells of this invention, although other fuels may be used.

The following description is added in August 1994.

FIG. 19 shows another embodiment of the invention in which a pair of right cylindrical coaxial tubular electrode members is firmly clamped together, sandwiching an electrolytic member between them to form a tubular cell assembly. Since the electrode members in this embodiment have a constant cross-section, there is little, if any, translation of outward expansion of the electrolytic member into axial forces urging the electrode members into clamping engagement with the electrolytic member. In this FIG. 19 embodiment, constant intimate engagement of the anodic and cathodic electrode members with the electrolytic member is maintained by constraining the composite tubular cell construction against a porous tubular internal support by means of a gas-permeable external, distributed restriction means. In the embodiment shown, the restriction means is provided by tightly winding a filament around the external cathode member, employing relatively small windings that are spaced to permit oxygen access to the cathode and removal of water therefrom.

Referring to FIG. 19, an inner anode 814 and an outer cathode 818 have sandwiched between them an electrolytic member 816, these members being formed of materials such as those having the characteristics described elsewhere herein. This composite tubular fuel cell assembly is supported in end caps 822 and 824 each of which is internally threaded at 832 for connection of a hydrogen supply which can be passed from one cell to the next.

Within tubular anode 814 is a tubular, porous support tube 840 which is rigid and has sufficient strength to bear the clamping pressure provided by external tightly wound filament 842. The presence of porous tube 840 is optional depending upon the structural strength of the anode 814 and of cathode 818. Porous tube 840 can be constructed of any suitable material, for example, it can be formed of rigid paper or ceramic, or may constitute a self-supporting screen of a rigid plastic material. Although, a metallic screen could be used, from a mechanical point of view it is preferred to avoid the use of metals in contact with hydrogen, where possible. Other structures, such as cross-members or bracing can also provide the support functions of porous tube 840. Porous tube 840 is also accommodated within end caps 822 and 824 and the whole tubular assembly is tightly sealed into end caps 822, 824 against hydrogen leakage by an insulating plastic sealant 844. Electrical connections are shown schematically at 846.

The purpose of the external wound filament 842 is to exert an evenly distributed clamping pressure on cathode member 818 to hold anode 814 and cathode 818 in tight, intimate engagement with electrolytic member 816 and to withstand swelling of electrolytic member 816 caused by generation of water therein. Accordingly, the material employed for filament 842 should be of relative high tensile strength and it should also be resistant to the corrosion that can occur in a damp, warm or even hot oxidizing atmosphere.

Accordingly, metal wires are not ideal and, if used should be plastic coated. A preferred material is a plastic-coated, glass fiber filament, for example a TEFLON (DuPont's trademark for polytetrafluoroethylene) coated, glass-fiber sewing thread. This filament has good tensile strength, is highly resistant to corrosion or other chemical attack, even at elevated temperatures, and the use of TEFLON gives it a hydrophobic, water-shedding character, facilitating the discharge of water from the fuel cell.

Filament 842 is wound with a pitch providing spacing between individual windings for the access of oxygen to the cathode, and for egress of water, or water vapor, therefrom. Preferably, this pitch is such that the spacing is between half and twice the thickness of an individual winding, with cross-layering of multiple windings being possible, so long as adequate gas-access and water release is provided. Filament 842 is selected and wound is such a manner as to provide a uniform, well-distributed clamping force and also to provide gaseous access to the cathode 818, through the spacing between individual windings, in an approximately evenly distributed, and generally uniform manner, so that all portions of the otherwise exposed, external surface of cathode 818 are close to an oxygen access point.

Fuel cells such as that depicted in FIG. 19 can be assembled by winding flexible woven carbon cloth sheets around a rigid porous plastic tube with a film of NAFION (trademark) electrolyte inserted between the carbon cloth layer which will provide the fuel cells cathode 818 and, if necessary, the composite tubular assembly is then cut to length, and sealed into end caps 822, 824. A further advantage of employing a glass fiber filament material, is that glass fiber filaments exhibit little shrinkage, or expansion, as between dry and moist states, and as between room temperature and the somewhat elevated temperatures which fuel cells of the type disclosed herein attain after a period of operation. This lack of shrinkage or expansion of the filament material ensures that the assembly is held together securely throughout periods of extended usage, and overcomes problems caused by expansion of the electrolyte member 816 which can force the electrodes 814 and 818 to separate from the electrolytic member 816 resulting in a loss of generation efficiency, and risks of hydrogen leakage and possible fires or explosions.

In a modified embodiment, the use of an inert, dimensionally stable, wound casing material, such as the TEFLON-coated, glass fiber filament referred to hereinabove, to hold electrode members in intimate contact with an electrolyte can be extended to a stacked plate, fuel cell assembly in which multiple flat layered cells lie one on top of another as disclosed, for example in Aldhart. Such filament windings could be coated or bonded by a polymer such as TEFLON, and wound around a stack of cells, at the ends thereof, or across the whole length or width, to replace the heavyweight steel bolts which are conventionally used to hold such stacks together and to provide a light assembly in which the need for bolt holes in the individual cells is eliminated. Hydrogen tubes can supply hydrogen to the stacks through relatively small holes accessing each cell and such tubes should be sufficiently rigid to allow alignment of the cells as they become pressed together by tightly drawing the filament winding around the entire stack assembly.

One such arrangement is depicted schematically in FIG. 20 which shows in side elevation a modified fuel cell assembly similar to that shown in Aldhart. Flat laminar fuel cell assemblies 860, each comprising a proton exchange membrane sandwiched between cathodic and anodic electrodes are interspersed between gas-distribution plates 862. External filament windings 864 (shown with exaggerated spacing for clarity) can be tightened around the assembly, optionally in multiple layers, which may be wound with opposing pitch angles to traverse one another, provided that sufficient openings remain for adequate air or oxygen access to the distribution plates 862.

Another embodiment of the inventive hydrogen fuel cell is shown in FIGS. 21(a) through 29. Referring to FIG. 21(a), in accordance with this embodiment of the hydrogen fuel cell, a first hollow member 910 is provided defining an interior space and having a peripheral surface. The first hollow member 910 receives a hydrogen containing gas and has a construction effective for passing the hydrogen containing gas from the interior space to the peripheral surface. The first hollow member 910 may comprise a porous tube, in which case the hydrogen containing gas passes through the pores in the porous tube from the interior space to the peripheral surface. Alternatively, as shown in FIGS. 21(a), 21(b), the first hollow member 910 may comprise a hollow tube having through-holes 912 for passing the hydrogen containing gas from the interior space to the peripheral surface. Grooves 914 can be disposed on the peripheral surface in communication with the through-holes 912 for facilitating dispersal of the hydrogen containing gas.

As shown in FIGS. 22(a) and 22(b), a first conductive winding 916 is wound around the peripheral surface of the first hollow member 910 to form an anode. The first conductive winding 916 includes a catalyst effective for decomposing hydrogen molecules in the hydrogen containing gas into active atomic hydrogen. The first conductive winding 916 may be made from titanium wire having a platinum coating or a platinum plating. The first conductive winding 916 forms an anode of the hydrogen fuel cell.

As shown in FIGS. 23(a) and 23(b), a proton-exchange electrolyte member 918 is disposed around the first conductive winding 916 to transport protons. The electrolyte member 918 preferably comprises a NAFION (trademark) perfluorosulforic acid polymer (also called an ionomer) film tube which is shrunk around the first conductive winding 916 so that the anode of the hydrogen fuel cell is in intimate contact with the electrolyte member 918. Such shrink-fitting can be effected by using the marked ability of NAFION (trademark) polymer membrane to swell when wetted. A wet polymer sleeve electrolyte member 918 is fitted over a first conductive winding 918 sized to be a close fit when the electrolyte member is wet. Thus enveloping first conductive winding 916, electrolyte member 918 is dried to shrink it tightly on to first conductive winding 916, in a state of considerable tension.

As shown in FIGS. 24(a) and 24(b), a cathode is formed by winding a second conductive winding 920 around the electrolyte member 918. The second conductive winding 920 also has catalytic properties effective for decomposing oxygen molecules in an oxygen containing gas into active oxygen atoms. The second conductive winding 920 may comprise a titanium wire having a platinum coating or a platinum plating. As is well known in the catalyst arts, rare metal catalyst such as platinum, palladium or their equivalents are more effective in a finely divided state. The present invention also contemplates provision of such finely divided catalyst, preferably more or less evenly distributed, across the gas-permeating outer surfaces of electrolyte member 918. While such catalytic means may be integral with the windings 916 and 920, for example as the above-described coating, it may alternatively be separately introduced into the interstices of the windings 916 and 920. After the cathode is formed by winding a second conductive winding 920 around the electrolyte member 918, the electrolyte member 918 is expanded (such as by swelling due to the addition of water to the electrolyte member 918).

Referring to FIGS. 25(*a*) and 25(*b*), a second hollow member 922 is provided for containing the first hollow member 910, the anode (first conductive winding 916), the electrolyte member 918 and the cathode (second conductive winding 920). The second hollow member 922 receives the oxygen containing gas, which may be ambient air, air enriched with $O_2$, or pure $O_2$, or the like.

As shown in FIG. 26, a male end cap 924 and a female end cap 926 are provided for sealing the inventive hydrogen fuel cell. The ends of the anode and the cathode (first conductive winding 916 and second conductive winding 920) terminate in wire ends 928 which are received into connection ports 930 of the male end cap 924 and the female end cap 926. The connection ports 930 of the male end cap 924 provide electrical connection between the wire ends 928 of the anode and cathode and respective electrical connection terminals 932. The connection ports 930 of the female end cap 926 provide electrical connection between the wire ends 928 of the anode and the cathode, and include respective electrical connection sockets 934. The electrical connection sockets 934 can receive the electrical connection terminals 932 of the male end cap 924 of another hydrogen fuel cell when connected (as shown in FIG. 27), if end-to-end fuel cell connection is desired. Alternatively sockets 934 and terminals 932 may be capped or may be plugged to a connector block or strip, or the like, designed to accommodate multiple such cells.

Hydrogen gas is introduced through a hydrogen gas port 936 of the male end cap 924 and enters into the interior space of the first hollow member 910. The hydrogen port 936 of the male end cap 924 terminates at a male fitting 938 which is received by a female receptacle 940 of the hydrogen port 936 of the female end cap 926. Oxygen containing gas is introduced into the inventive hydrogen fuel cell through an oxygen port 942 on the male and female end caps 924, 926. The oxygen port 942 on the male end cap 924 terminates in an oxygen port fitting 944 which is received by a female receptacle 946 of the female end cap 926.

The modified male end cap 924 shown in FIG. 26(*b*) provides for series connection between fuel cells by reversing the polarity of connection terminals 932 versus connection ports 930 with a crossover 933. Crossover 933 connects a radially inner connection port 930, mating with a negative polarity wire 928 on one cell, to a radially outer connection terminal 932, mating with a positive polarity connection socket 934 on an adjacent cell. Series connection will usually be desirable for higher voltage output, since fuel cells according to the invention can generate very substantial currents but yield only modest individual voltages, perhaps 0.6 or 0.7 volts.

As shown in FIG. 27, the interfittability of the end caps, coupled with the fact that all joints to be sealed against hydrogen leakage are at the opposed ends of each cell enables the cells to be assembled end-to-end in modular fashion. When two hydrogen fuel cells are thus joined together, the male end cap 924 of the first hydrogen fuel cell mates with the female end cap 926 of the second hydrogen fuel cell so that the anode and cathode connection terminals 932 plug into the respective connection sockets 934 of the female end cap 926 for electrical connection between the anode and cathode of the respective hydrogen fuel cells.

The male fitting 938 of the male end cap 924 is received by the female receptacle 940 of the female end cap 926, and the oxygen port fitting 944 of the male end cap 924 is received by the female receptacle 946 of the female end cap 926 thus joining the first hydrogen fuel cell to the second hydrogen fuel cell. Multiple hydrogen fuel cells may be connected in a similar manner. The hydrogen fuel cells may then be clamped together or otherwise secured (not shown). Joints between adjacent cells can readily sealed with a suitable polymeric sealant. Because of the configuration of the inventive fuel cell, expansion of electrolytic member 918, as it absorbs by-product water, does not subject the cell's seals to separating forces.

As shown in FIG. 28, the first conductive winding 916 (anode) is in close intimate contact with the NAFION (trademark) electrolyte member 918. Also, the second conductive winding 920 (cathode) is in close intimate contact with the NAFION (trademark) electrolyte member 918. During operation of the inventive hydrogen fuel cell, hydrogen gas is supplied to the interior space of the first hollow member 910 and passes through the first hollow member 910 to the peripheral surface thereof. Hydrogen molecules here come in contact with the platinum catalyst 949 coated on the first conductive winding 916 and decompose into hydrogen atoms which then have their electrons stripped, resulting in the formation of protons which are transported through the NAFION (trademark) electrolyte member 918 to the cathode constituted by the second conductive winding 920. Oxygen containing gas introduced into the second hollow member 922 comes into contact with the platinum catalyst 949 coated on the second conductive winding 920. The oxygen molecules are broken down into oxygen atoms that accept electrons while reacting with protons reaching the cathode side of the electrolyte member, and thus form water. During the operation of the inventive hydrogen fuel cell, electrons are driven to flow in the opposite direction to proton travel providing an electrical current, thereby enabling productive use of the energy released through the operation of the inventive hydrogen fuel cell.

FIG. 28 further shows, in a schematic way, how electrolytic member 918 expands as it becomes wet in use to fill the spaces between windings 916 and 920 and to become tightly packed therebetween. This arrangement, as will be apparent from considering FIG. 28, provides some means for taking up the expansion of electrolytic member 918 as it absorbs moisture without imposing disruptive forces on the cell structure that might, in other constructions, separate cell elements causing gas leakage.

Arrow 962 in FIG. 28, shows a direction of hydrogen access to the electrolytic member 918 between two windings 916 which, if necessary for gas access, can be spaced apart, with a maximum spacing between windings 916 or 920 of about one quarter the diameter of an individual winding. However, for a gas with the migratory powers of hydrogen, the combination of a normal tight-packing of windings 916 and a modest gas pressure of a few pounds per square inch can be adequate to permit hydrogen to access the electrolytic member 918.

Similarly, oxygen can be supplied in the form of compressed air in the direction of arrow 960, using somewhat higher pressures of about 10 to 20 psig. With the structure shown, in order to gain access to the electrolytic member 918 the gases must pass through a closely confining channel between individual windings 916 and 920 where they are exposed to the catalyzing action of surface coating 949 on windings 916 and 920, over an extended area, thus enhancing dissociation into atomic hydrogen or oxygen.

FIG. 28*a* shows an alternative construction of fuel cell having windings 916 or 920 designed further to enhance catalytic activity. Here, windings 916 or 920 have a square or rectangular cross-section further to increase the extent of the channel through which the migrating gases travel to access electrolytic member 918. In addition the windings are subjected to surface treatment to increase the surface area of catalyst. The surface treatment can be any one of various forms of mechanical actions effected for example with a diamond die, such as roughening, scoring or grooving. In FIG. 28*a* transverse angled grooves are shown which serve to maintain a gas access passage between a gas windings while extending the distance traveled by gases passing over the catalyst surface to improve the catalytic action. Surface roughening or other surface configurations can be employed in place of the grooving. Because fuel cells of the type disclosed herein develop rather modest voltages of about 0.6 or 0.7 volts, it is important that withdrawal of current from the cell be effected with a very low impedance current collection system. The novel winding structures disclosed herein facilitate very low resistance current collection and contact between adjacent roughened windings 916 as shown in FIG. 28*a*, is a further safeguard, helping keep resistances low. By employing catalyst-coated windings, as disclosed herein, the invention ensures that there is a catalytical active zone physically outside the boundaries of the electrolytic member 918, the wet environment of which may tend to clog or smother the activity of conventional deposits or surface coatings of finely divided catalyst particles on the membrane itself. Clearly some catalytic activity may occur on the outer surfaces of winding 916 and 920 remote from electrolytic member 918 in a pre-reactivation process, or effecting dissociation of at least a small percentage of molecules before the membrane 918 is encountered.

FIG. 29 shows an alternative construction of the inventive hydrogen fuel cell. In this case, the male end cap has a threaded male fitting 938 that screws into a threaded female receptacle 940 of the female end cap 426 of another similarly constructed hydrogen fuel cell. The wire ends 928 of the anode and cathode exit through the second hollow member 922. The oxygen port fitting 944 is threaded for connection with an oxygen gas supply hose (not shown). The oxygen port fitting 944 is disposed on the second hollow member 922, so that the threaded male fitting 938 of a first hydrogen fuel cell can be screwed into the threaded female receptacle 940 of a second hydrogen fuel cell. Multiple hydrogen fuel cells can be easily connected together in this manner.

FIGS. 30(*a*) through 31(*b*) show a multiple fuel cell assembly in accordance with another aspect of the present invention. The multiple fuel cell assembly allows a number of individual fuel cells (such as those having a construction as described herein) to share a single replaceable hydrogen gas supply tank. FIGS. 30(*a*) and 30(*b*) are a top plan view and a bottom plan view, respectively, of the multiple fuel cell assembly. FIG. 31(*a*) is a side plan view of an individual fuel cell 950, and FIG. 31(*b*) is a side plan view of the replaceable hydrogen gas supply tank. A plurality of individual fuel cells 948 is disposed around a central hydrogen gas supply tank 950. Hydrogen gas is received by each individual fuel cell 948 through a corresponding gas supply line 952. The hydrogen gas supply tank 950 has a screw fitting 958 (shown in FIG. 31(*b*)) that is screwed into a distribution cap 956. During operation, hydrogen gas from the hydrogen gas supply tank 950 is distributed to each individual fuel cell 948. The individual fuel cells 948 are contained within common containing walls 954, between which oxygen containing gas flows for use by the fuel cells 948 in the generation of electricity. Alternatively, each individual fuel cell 948 may be contained within a corresponding containing structure, or open to the ambient air. The individual fuel cells 948 can be dimensioned to accommodate a standard gas cylinder, thus obviating the need for a specially manufactured hydrogen supply tank. The structure shown in which fuel cells 948 surround or enclose a hydrogen canister 950 permit transfer of heat from cells 948 to canister 950. This heat can be utilized to cause hydrogen to flow, or to increase the hydrogen flow from supply tank 950 and is particularly beneficial in maintaining hydrogen flow from a hydride hydrogen source, especially under low temperature ambient conditions.

As an example, a configuration of the multiple fuel cell assembly may include 16 individual fuel cells 948 each having a diameter of four inches and a length of 24 inches for an electricity producing active area of about two square feet per cell. The total electricity producing active area in this example configuration is thus 32 square feet. The hydrogen gas supply tank 950 may have a volume of 2.5 cubic feet. The containing walls 954 define a space having an inner diameter of about 22 inches and an outer diameter of about 32 inches so that the overall size of this example of a multiple fuel cell assembly has a 32-inch diameter and a 24-inch length. It is estimated that such an assembly may, when operated at high or optimal efficiency, provide in excess of 10,000 watts of power.

FIGS. 30(*c*) and 30(*d*) show an alternative hydrogen delivery distribution system in which fuel cells 948 are connected in series so that hydrogen can be supplied from one to another down a pressure gradient. Here two radial hydrogen supply lines 970 extend from supply tank 950 to adjacent cells 948. Cells 948 are series interconnected top and bottom, in staggered manner, by links 972, alternately at the tops and bottoms of adjacent pairs of cells so that hydrogen passes up one cell and down the next. As shown here, hydrogen is fed from both ends of the series of cells 948, in two pressure gradients. If a single gradient is preferred, hydrogen may be fed to one end only through a single radial supply line 970.

Fluid Management

If desired, supplemental water, heat and gas circulation systems can be provided to service individual ones of the cells described herein, or preferably to service an array of such cells when assembled into a high power, light weight battery. A preferred such system, used to withdraw by-product moisture or water from the cell which can comprise a fan and recirculating means to withdraw air or oxygen from the cathode side of the cell. Preferred embodiments recirculate, or simply circulate, either air under fan pressure or compressed air in an enclosed system. Where feasible, subject to the intended operating environment of the fuel cell, a few atmospheres of compressed air may be desirable to improve cell efficiency.

A desirable or required operating condition of the type of fuel cell described herein, when employing a wet-operating membrane, is that the anode, hydrogen-receiving side of the cell be kept moist. Often moisture is entrained in the hydrogen flow at the hydrogen source, especially if a hydride source is used. However, supplemental moisturizing of the hydrogen flow may be desirable and water for this purpose can be recovered from the cathode ventilating means described above.

Such fluid handling systems can be incorporated in a cell bank in the manner shown schematically in FIG. 31(c). A cathode-side air or water pump 980 moves air over the cathodes of a bank of cells 948 withdrawing moisture or water therefrom, and cooling them. Output of pump 980 passes to a water extractor 982 where water is separated and passes to anode humidifier 984. Dried air from water extractor 982 can be recirculated. Hydrogen pump 986 moves hydrogen through anode humidifier 984 to moisten it and delivers hydrogen to the anodes. With adequate air circulation, cooling is not necessary, but if desired, a heat extractor can be included in the air-water circuit.

Self-contained, renewable power source

Referring to FIG. 32, a fuel cell such as that shown in FIG. 13 can be adapted to become a self-contained, renewable power source by receiving a screw-in hydrogen cylinder 990 into the cell, to be substantially contained therewithin. As shown, end plug 522 is modified to receive a cylinder 990 as a close fit, while end cap 520 is supplied with a screw fitting 992 to receive the hydrogen cylinder 990's nozzle 994. An interior liner 996 defines an annular hydrogen chamber 998 which admits nozzle 994 through a snap valve 999.

Manufacture of FIGS. 21(a) through 29 embodiments

The hydrogen fuel cell shown in FIGS. 21(a) through 29 can be easily manufactured utilizing methods such, for example, as the inventive manufacturing methods described herein which are adaptable to high volume mass manufacturing techniques. A first hollow member 910 is provided defining an interior space and having a peripheral surface. The first hollow member 910 is for receiving a hydrogen containing gas and is effective for passing the hydrogen containing gas from the interior space to the peripheral surface (FIG. 21(a)). A first conductive winding 916 is wound around the first hollow member 910 to form an anode (FIG. 22(a)). The first conductive winding 910 has a catalyst effective for decomposing hydrogen molecules from the hydrogen containing gas into H$^+$ ions (FIG. 28). An electrolyte member 918 is disposed around the anode. Preferably, the electrolyte member 918 comprises a tube of NAFION (trademark) film which is shrunk around the first conductive winding 916 (FIG. 23(a)). A second conductive winding 920 is wound around the electrolyte member 918 to form a cathode. The second conductive winding 920 has a catalyst effective for decomposing oxygen molecules in an oxygen containing gas into oxygen atoms. After the second conductive winding 920 is wound around the electrolyte member 918, the NAFION (trademark) film electrolyte member 918 is expanded by introducing water to swell the NAFION (trademark) film [FIG. 24(a)]. A second hollow member 922 is disposed loosely around the second conductive winding 920 for containing the first hollow member 910, the anode (first conductive winding 916), the electrolyte member 918 and the cathode (second conductive winding 920). The second hollow member 922 receives the oxygen containing gas which is then decomposed by the catalyst formed on the second conductive winding 920 [FIG. 25(a)]. Finally, a male end cap 924 and a female end cap 926 are installed to complete the hydrogen fuel cell (FIG. 26). A plurality of thus formed hydrogen fuel cells are joined together by mating the male end cap 924 of a first hydrogen fuel cell with the female end cap 926 of a second hydrogen fuel cell (FIG. 27 and FIG. 29).

Some uses and advantages

Their self-contained, free-standing structure affords the tubular fuel cells of the invention many options for packing or assembling into batteries or arrays that are not possible with a fuel cell stack. In one example of a simple, practical array, useful for a field soldier, or other field operative, three tubular cells, each 2 inches (about 5 cm.) in diameter and 7 inches (about 18 cm.) in length can be mounted vertically onto a 9 inch (about 23 cm.) wide belt wrapped around a solider's waist. These three light-weight cells, preferably each weighing less than one pound (453 gm.), each contain about 30 square inches (193 sq. cm.) of active surface. Referencing the data reported in FIG. 1 of Wilson et al., supra, page 16, a theoretical output of 1.5 amps/cm$^2$ at 0.6 volts is obtainable. Accordingly, if constructed as taught by Wilson et al., such a package of three cells will produce 520 watts, a margin of power of almost two over a current U.S. Army specification for portable electric power sources for soldiers of the future.

The tubular cells of this invention overcome problems caused by the high coefficient of dry-to-wet expansion of NAFION polymer, primarily through the radial strength of extremely light weight carbon fiber sleeves having, in the fibers, tensile strength greater than steel. Moisture-absorbing electrolyte expansion exerts very little pressure on the seals of tubular cells, which as taught herein, are located at the joints at the ends of the cells. Importantly, in contrast to the multiple laminations that must be sealed and gasketed in stacked flat cells, there are only two seals to be made in each tubular cell, at the cell ends around the substantially circular ends of its multiple concentric tubular members. Structural stability is enhanced by using wound electrode members the windings of which can advantageously be heavy gauge conductor wire rated to remove the large currents generated with a minimum of impedance losses. The heavier the gauge, the greater the structural strength. Suitable end seals can be made through the use of cast resin in relatively large cross-sections or even by pressure molding plastic polymer to the ends of each cell.

Unlike compressed flat cell stacks, tubular fuel cells can also be spatially separated, reducing heat build up and thermal management requirements. Water management requirements are also reduced because air can be circulated over substantially the entire cathode area to move water continuously away from it, using natural or forced convection.

Referring now to the embodiment of FIGS. 33(a) through (f) there is shown a composite structure of fuel cell having a tapered tubular configuration with a taper along the tube which is here selected to be of the order of 1%. This cell incorporates many of the features of the foregoing embodiments, in combination.

The interfitting, nested, tapered shape of each tubular, sleeve-like cell members facilitates tight assembly of the various cell layers into intimate contact, each with its neighbor, so each electrolyte surfaces is pressed into intimate contact with a respective electrode throughout the electrode area, with a minimum of zones of poor, or unconstrained contact. The taper translates lengthwise stresses, imposed during manufacturing into lateral or radial compressive forces packing the nested layers together and permits lengthwise assembly of closely dimensioned interfitting layers.

The embodiment shown in FIGS. 33(a)–(f) preferably employs inner and outer tapered-helix wound current collectors of sufficiently robust construction to constitute load-bearing formers. Also of note is the use of separately fabricated catalyst layers pressed onto either side of an electrolytic proton exchange membrane, sandwiching it, and the use of separately fabricated gas diffusion layers or members to manage distribution of oxygen and hydrogen to the catalyst and membrane layers.

The multi-layer construction of the cell is most readily apparent from the enlarged sectional view of FIG. 33(f). A polymer exchange membrane electrolytic member 1110 is disposed as a central layer. Reading down FIG. 33(f), from electrolytic member 1110, in a direction inwardly toward the center of the fuel cell, the layers comprise anodic catalyst layer 1112, anode gas diffusion layer 1114, an anode collection layer 1116 and an optional inner housing member 1118.

Reading upwardly from electrolytic member 1110, in a direction outwardly, of the fuel cell, there is a cathodic catalytic layer 1120, a cathode diffusion layer 1122, a cathode collector 1124 and an oxygen supply passage 1126, the latter being defined in an outer housing member 1128.

Catalyst layers 1112 and 1120 are porous so as to be freely gas-pervious and support a finely divided catalyst, such as platinum in a conductive medium, for example carbon black. Cathode catalyst layer 1120 also exhibits substantial water vapor porosity for the removal of water vapor from the cathode side of the cell. The porous conductive catalyst layers 1112 and 1120 are preferably thin coatings and provide a distinct gas-dissociation stage in intimate contact with electrochemically active electrolytic member 1110 to ionize the dissociated atoms promptly before they recombine into molecules. Catalyst layers 1112 and 1120 are fine-pored and have a very high effective surface area to divide the gas flow into fine microscopic or sub-microscopic streams, and to ensure that a high proportion of gas molecules contacts the catalyst surfaces to be dissociated into atoms. The surfaces of catalyst layers 1112 and 1120 may be thought of as intermeshing with that of electrolytic member 1110 to increase the apparent surface area. Currently preferred embodiments of the invention, employing the preferred material recited herein, have a thickness in the range of about 0.002 to 0.007 inch, with an ultra-thin catalyst layer coating of the order of one millionth of an inch.

Gas diffusion layers 1114 and 1122 serve laterally to spread the flow of gases migrating to the interior electrolytic layers of the cell from between the windings of current collector layers 1126 and 1124, permitting a better distribution of gas over the whole surface area of the cells or of the boundaries between the active layers. Each current collector 1116 and 1124 and its associated diffusion layer 1114 or 1122, can be regarded as constituting a corresponding cell electrode, collector 1116 and diffusion layer 1114 constituting the anode, while collector 1124 and diffusion layer 1122 constitute the cathode.

Desirably, electrolytic member 1110 extends beyond the hydrogen-distributing anodic layers 1112 and 1114, for hydrogen leak prevention. As shown in FIG. 33(d), end plugs 1132–1134, which may be prefabricated, but are preferably cast in situ from a non-conductive, hydrogen sealing resin or polymer, close the ends of the cell and provide hydrogen seals. Preferably the ends at least of electrolytic member 1110, anode catalyst layer 1112 and anode gas diffusion layer 1114 are embedded in the end plugs 1132 and 1134.

Current collectors 1116 and 1124 comprise open-form, or foraminated, structural conductive members, here shown as wire windings 1117 and 1125 respectively, each embedded in a conductive, gas-porous, structural matrix 1119 and 1127, respectively.

Windings 1117 and 1125 can be of any conductive material that has adequate tensile strength, load-bearing rigidity and can withstand the corrosive environment within the fuel cell. Metals such as titanium are preferred. A still more preferred winding 1117 and 1125 has a more complex structure and comprises titanium clad copper wire which can be formed by drawing coaxial tubes of the two metals. Such a coated winding can have its titanium ends bared externally of the electrolyte environment to form copper connectors which are preferable for outputting large currents at low voltages. Depending upon the cell's rating, windings 1117 and 1125 may be quite heavy gauge, up to perhaps one-sixteenth or one-eighth of an inch diameter. Besides windings, other forms of open-work, conductive former can be provided in tubular form, for example, braided or mesh or perforate structures or expanded metal such as expanded titanium available under the trademark DELKER.

With a view to reducing cell impedance, windings 1117 and 1125 may be in the form of coiled-coil filaments employing a fine gauge wire filament coiled to provide the winding, which coiled filament winding is coiled again around the fuel cell. Such a structure is intended to bring more current-collecting wire surface into closer contact with the surface of the electrolytic member 1110.

Matrices 1119 and 1127 are preferably carbon black or other finely divided conductive material dispersed in a structural binder such as a substantially rigid porous resin or ionomer which is preferably hydrophilic to be conductive. Desirably, also a finely divided hydrophobic material such as polytetrafluoroethylene, for example, TEFLON (trademark, DuPont) is included in the matrix to shed water, especially on the cathode side of the cell. The matrix-embedded winding structure of current collectors 1116 and 1124 is lightweight yet has exceptional strength to contain expansion of electrolytic member 1110 and press the cell's electrodes into intimate engagement with it.

While described and shown as separate structural elements, modified embodiments of the invention are contemplated in which current collectors 1116 or 1124 are integral with diffusion layers 1114 or 1122, for example as shown schematically in FIG. 33(e).

Optional inner housing member 1118 can provide structural support, if desired, for example, for a smaller embodiment of cell with a lower current rating having a smaller gauge, less robust winding 1116. Inner housing member 1118 can also optionally be adapted to provide other functions, such as hydrogen delivery enhancement.

One form of hydrogen delivery enhancement structure is embodied in grooves 1136 which constitute one or more continuous (tapered) helices delivering hydrogen to anode current collector 1116. Preferably, hydrogen is delivered to the electrolytic member 1118 so far as possible, along a substantial pressure gradient, with the hydrogen moving in one direction through confined passageways so as to keep it moving and avoid stills or stagnancies that may impede cell performance.

Manufacture of tubular cells with wound electrodes

A tubular cell having wound electrodes such as the tapered tubular cell shown in FIGS. 33(a)–(f), can be manufactured by the following method which is readily adaptable to mass production. A tapered steel mandrel is coated on its outer surface with a release agent such as a polytetrafluoroethylene or a silicone. Over this surface is coated a slurry of finely divided platinum particles mixed with carbon black in an organic solvent dispersant. The slurry coating is dried and baked to form a sleeve on the release surface of the conical mandrel, anode diffusion layer 1114.

A tube of NAFION polymer is immersed in water to cause it to swell. It is then placed over the coated mandrel and dried so that it shrinks tightly over the mandrel, forming electrolytic member 1110.

Two half-tube metal molds, dimensioned to fit electrolytic member 1110, are coated with release agent then with a platinum-carbon dispersion, as described above, and baked into place to form cathode diffusion layer 1122. The hot tubes and coating are pressed lengthwise onto the mandrel using its taper to compress the diffusion layers 1114, 1122 on to the polymer-film electrolytic member 1110 so that the catalyst layers transfer to it. The half tubes and mandrel are then removed lengthwise. If desired, or necessary, radial pressure can be exerted by known mechanical means.

Two titanium wire tapered tubes, carefully sized for nesting, one inside and one outside the assembled layers, are placed in tubular molds which are then filled with carbon black which has been treated according to the directions of the Los Alamos Laboratory. The carbon black is molded under heat and pressure so as completely to envelop the titanium wire matrix, except for the ends which extend beyond the molded portion to provide current connectors at each end of the tube. The products are suitable for use as anode and cathode current collectors 1116 and 1124.

Final assembly of the composite tube is effected by placing the electrolyte tube 1110 with catalytic layers 1112 and 1120 over the smaller diffusion tube 1114 and then placing the larger diffusion tube 1122 over the catalyst-covered electrolyte tube 1110. The nested tubes are pressed firmly together, lengthwise, with heat applied, if desired.

Plastic end plates fitted with small gas tube fittings such, for example, as shown in FIGS. 26 and 29, are pressed into the inside of the center wire tube at one end and over the outside of the outside wire tube at the other end. A plastic air cover with entrance and exit tube fittings is placed over the end pieces. Plastic sealant is then poured into the seal area adjoining each end piece to form sealed end plugs 1132 and 1134 and complete the assembly.

The above-described manufacturing steps can be included in a production assembly line which also includes test equipment for final testing of each fuel cell. Many of the operations can be carried out by robots as none of the individual operations requires difficult manipulation.

The fuel cell embodiments of the invention described herein permit simplified fuel cell manufacture through elimination of the complicated sealing and gasketing required to build stacks of flat cells. The innovations described and disclosed herein provide novel fuel cells designed to achieve commercial reliability, that are commercially adaptable to mass production manufacturing techniques at a commercially acceptable price, and are ultra light weight.

In summary, the several embodiments of the invention disclosed herein provide great freedom of choice to an engineer in developing improved wet-membrane, room temperature-operative fuel cells, especially hydrogen fuel cells, by avoiding the constraints imposed in stacked fuel cell assemblies, where swelling of the electrolytic membranes induced by water synthesis in the cells acts in directions that tend to open gas seals designed to contain the gaseous fuel. Fuel leakage, and especially leakage of highly volatile, flammable gaseous hydrogen, with its attendant risks of fire and explosion, is an important problem to avoid. To maintain the seals in stacked, wet-membrane fuel cells, heavy weight cumbersome, expensive and restrictive mechanical structures have been used, prior to the present invention, such as the steel cover plates 24, manifold covers 26 and screws 28, that are used by Adlhart to bolt the fuel cell together and compress the stack (column 7, line 64 to column 8, line 3). Since each cell may have 10 or more laminations and stacks of only about seven cells may have hundreds of apertures to seal, reliability is also poor.

In contrast, the invention permits multiple fuel cells to be disposed freely in a variety of configurations, including in a side-by-side manner, enabling the peripheries of individual cells to be separately sealed by members or sealants that are not subjected to swelling forces generated in the ion-exchange electrolytic membrane. This separation of functions enables the problem of maintaining intimate contact between the electrode members and the swollen electrolytic membrane to be addressed by separately acting structural means such as the self-clamping tapered electrode members, and the wound filament described herein.

Gas ducting is also facilitated because, in the inventive embodiments, fuel and oxidizing gases do not have to be supplied through load-bearing distribution members, and can access the electrode surfaces through porous members which may also serve structural support functions, or through simple pipe-like ducts, or can be channeled by the electrodes themselves or, in the case of the cathodes may simply be exposed to an ambient atmosphere. Thus, much more open configurations are possible, yielding flexibility in the detailed design of means for supplying hydrogen and oxygen to the inventive fuel cell and for removing water therefrom.

Tubular and tapered tubular embodiments of fuel cell, such as those shown in FIGS. 13 on, are particularly well adapted to function at relatively low, albeit elevated temperatures (circa 80°–100° C.), with wet-operating electrolytic membranes which are prone to substantial swelling in operation, by absorbing the swelling forces between concentric tubular members. Where the concentric tubular members comprise carbon fibers, derived for example from woven carbon cloth, exceptional tensile strength and conductivity is provided in a light weight structure. NAFION (trademark, DuPont), in the present state of the electrolytic membrane arts is a preferred material for the electrolytic member but will swell as much as 16% when wetted. As a fuel cell is repeatedly powered up and shut down during use, its electrolytic member undergoes repeated swelling and shrinkage. Moisture is generated in use. The cell dries out when shut down, and repeatedly heats up and cools down as it is used. Such continued cyclical expansion and contraction imposes enormous stresses on structural confining members of the cell, which are effectively accommodated by the tubular and tapered structures described and shown herein.

If and when available, electrolyte members that do not swell will be desirable for incorporation in fuel cell embodiments such as those shown in FIGS. 1–12 to be conveniently available in extended, preferably flexible strips and rolls.

In turn, these innovations permit a wide variety of different structures and geometrical configurations to suit different operating requirements and design parameters, giving skilled workers great freedom of design choices, in adapting the invention to particular circumstances, as witnessed by the strip, tubular and conical cell embodiments described herein which can all be fabricated from lightweight, economical and adaptable carbon-fiber and polymeric materials, and which can also be configured in to flexible structures, giving manufacturers and users an additional range of possibilities.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A method of making a hydrogen fuel cell, comprising the steps of:

a) providing a first hollow member defining an interior space and having a peripheral surface, the first hollow member for receiving a hydrogen containing gas and being effective for passing the hydrogen containing gas from the interior space to the peripheral surface;

b) winding a first conductive winding around the first hollow member to form an anode, the first conductive winding having a catalyst effective for decomposing hydrogen molecules from the hydrogen containing gas into $H^+$ ions;

c) disposing an electrolyte member around the anode; and d) winding a second conductive winding around the electrolyte member to form a cathode, the second conductive winding having a catalyst effective for decomposing oxygen molecules in an oxygen containing gas into oxygen atoms.

2. A method of making a hydrogen fuel cell according to claim 1, further comprising the step of:

e) disposing a second hollow member for containing the first hollow member, the anode, the electrolyte member and the cathode, and for receiving the oxygen containing gas.

3. A method of making a hydrogen fuel cell according to claim 1, wherein the step of disposing an electrolyte member around the anode comprises disposing a tube of perfluoro sulforic acid polymer film around the anode and then shrinking the tube of film; and further comprising the step of expanding the tube of film after the step of winding the second conductive winding.

4. A method of manufacturing a hydrogen fuel cell comprising a self-supporting shaped, layered electrode structure in which a solid-phase proton-transporting electrolyte is sandwiched between a porous anodic electrode and a porous cathodic electrode, comprising the steps of a) coating a first, shaped self-supporting electrode with a curable, liquid-phase, proton-transporting electrolytic material to provide an electrolytic coating;

b) curing said electrolytic coating to the solid phase;

c) assembling said coated electrode with a second, mating, shaped electrode to provide said layered structure;

d) and assembling said electrode structure with a support base.

5. A method according to claim 4, comprising a further step of coating said first electrode with a catalyst-containing curable, liquid-phase proton-transporting material.

6. A method according to claim 5, wherein said curing step has two stages: a first, solvent-evaporation stage at a moderately elevated temperature, and a second purification or decontamination stage at a higher temperature.

7. A method of manufacturing a shaped, non-flat, layered fuel cell of the wet-electrolyte type, having fuel cell components comprising current collecting electrodes and a wet-operating electrolytic member compressed between said electrodes, wherein oxygen is reduced by a combustible gas, said method comprising the steps of:

a) forming a first gas-pervious, load bearing, current collecting electrode to a first shape;

b) forming a second gas-pervious, load bearing, current collecting electrode to a second shape mateable with said first shape; and c) assembling said first and second current-collecting electrodes with said electrolytic member into a self-supporting structure.

8. A method according to claim 7 wherein said electrodes are shaped to clamp said electrolytic member when mated together.

9. A method according to claim 8 wherein said fuel cell and said fuel cell components have a tubular shape and said components are assembled to be disposed substantially concentrically.

10. A method according to claim 9 wherein said tubular shape is tapered to be frusto-conical.

11. A method according to claim 10 wherein said fuel cell components are pressed together lengthwise, said tapered shape impose compressive radial stresses on said electrolytic member.

12. A method according to claim 11 wherein said fuel cell components include gas diffusion members to spread reaction gases for uniform distribution to opposed surfaces of said electrolyte.

13. A method according to claim 7 wherein said electrodes comprises an open work load-bearing metal structure.

14. A method according to claim 13 wherein said metal is titanium.

15. A method according to claim 13 wherein said metal structure is selected from the group consisting of a coiled winding, expanded metal and metal braiding.

16. A method according to claim 7 wherein one or more of said fuel cell components is shaped around a former.

17. A method according to claim 7 comprising inserting plugs at the ends of said fuel cell to seal said fuel cell against loss of combustible gas.

18. A method of manufacturing a shaped, non-flat, layered fuel cell of the wet-electrolyte type, having fuel cell components comprising current collecting electrodes and a wet-operating electrolytic member compressed between said electrodes, said method comprising the steps of:

a) forming a first gas-pervious, load bearing, current collecting wound titanium wire electrode to a coiled tapered open-ended tube;

b) forming a second gas-pervious, load bearing, current collecting titanium wire electrode to a coiled tapered tube sized to receive said first electrode and to mateably clamp said electrolytic member between said electrodes; and c) assembling said first and second current-collecting electrodes with said electrolytic member by inserting one component into another lengthwise;

d) pressing said components together lengthwise to compress said electrolytic member radially; and e) plugging said tube endwise to seal said cell against loss of combustible gas.

* * * * *